(12) United States Patent
Paglin

(10) Patent No.: US 6,393,421 B1
(45) Date of Patent: May 21, 2002

(54) COMMUNICATION METHOD AND SYSTEM UTILIZING A SPECIFIC COMMUNICATION CODE UNIQUELY ASSIGNED TO THE DATA RECORD

(76) Inventor: Neriel Paglin, 8 Antokolsky Street, Tel-Aviv 64044 (IL)

( * ) Notice: Subject to any disclaimer, the term of this patent is extended or adjusted under 35 U.S.C. 154(b) by 0 days.

(21) Appl. No.: 09/369,383

(22) Filed: Aug. 6, 1999

(30) Foreign Application Priority Data

Sep. 18, 1998 (IL) .................................................. 126301
Mar. 11, 1999 (IL) .................................................. 128935

(51) Int. Cl.$^7$ ........................ G06F 17/30; G06F 15/16
(52) U.S. Cl. ............................ 707/9; 707/10; 707/201; 709/217
(58) Field of Search ...................... 707/9, 10, 201–204; 709/201–204, 212, 216, 217–219, 224, 229, 246

(56) References Cited

U.S. PATENT DOCUMENTS

| | | | |
|---|---|---|---|
| 4,645,873 A | 2/1987 | Chomet | 379/93.12 |
| 4,868,866 A | 9/1989 | Williams, Jr. | 707/9 |
| 5,012,405 A | 4/1991 | Nishikado et al. | 707/8 |
| 5,247,661 A | 9/1993 | Hager et al. | 707/104 |
| 5,440,541 A | 8/1995 | Iida et al. | 370/352 |
| 5,446,882 A | 8/1995 | Capps et al. | 707/104 |
| 5,594,722 A | 1/1997 | Iida et al. | 370/426 |
| 5,663,547 A | 9/1997 | Ziarno | 235/380 |
| 5,664,207 A | 9/1997 | Crumpler et al. | 707/505 |
| 5,665,952 A | 9/1997 | Ziarno | 235/380 |
| 5,717,863 A | 2/1998 | Adamson et al. | 709/204 |
| 5,752,025 A | 5/1998 | Shakib et al. | 707/102 |
| 5,813,007 A | 9/1998 | Nielsen | 707/10 |
| 5,862,325 A * | 1/1999 | Reed et al. | 709/201 |
| 5,940,504 A * | 8/1999 | Griswold | 380/4 |

(List continued on next page.)

FOREIGN PATENT DOCUMENTS

| | | |
|---|---|---|
| EP | 0 964 343 | 12/1999 |
| WO | WO 96/36927 | 11/1996 |
| WO | WO 98/16045 | 4/1998 |
| WO | 99 23591 | 5/1999 |

OTHER PUBLICATIONS vCard: The Electronic Business Cards, Version 2.1, Jan. 1, 1997, pp. 1–4.
vCard Overview, Oct. 13, 1998, www.imc.org/pdi/vcardoverview.html, pp. 1–3.
O'Connor et al., "Managing contacts in Windows 95", Apr. 30, 1996, pp. 79.
Pepper et al., "The CallManager system: A platform for intelligent telecommunications services", *Speech Communication*, (1997), vol. 23, pp. 129–139.
Zimmerman, "Personal Area Network: Near–field intrabody communication", *IBM Systems Journal*, (1996), vol. 35, Nos. 3 and 4, pp. 604–617.

Primary Examiner—Maria N. Von Buhr
(74) Attorney, Agent, or Firm—Browdy and Neimark, P.L.L.C.

(57) ABSTRACT

A communication system and method are presented for enabling keep in touch technique between an owner of at least one communication code and a receiver of the at least one communication code utilizing a manager utility. The code owner, or any other authorized person, creates a data record containing information belonging to the code owner, and feeds this data record to the manager utility. The manager utility, upon receiving the data record, stores it in a database and assigns the at least one communication code associated with at least the predetermined part of the stored information to the data record owner. Upon receiving the at least one communication code from the code receiver, the manager utility provides him with at least the predetermined part of the stored information of the code owner. Upon detecting that changes have been made to the data record of the code owner, the manager utility operates to update the code receiver.

31 Claims, 16 Drawing Sheets

U.S. PATENT DOCUMENTS

| | | | |
|---|---|---|---|
| 5,970,492 A | * 10/1999 | Nielsen | 707/10 |
| 5,970,501 A | * 10/1999 | Hunkins et al. | 707/200 |
| 5,978,828 A | * 11/1999 | Greer et al. | 709/224 |
| 5,978,842 A | * 11/1999 | Noble et al. | 709/218 |
| 5,983,268 A | * 11/1999 | Freivald et al. | 709/218 |
| 6,041,360 A | * 3/2000 | Himmel et al. | 709/245 |
| 6,055,570 A | * 4/2000 | Nielsen | 709/224 |
| 6,065,044 A | * 5/2000 | Ogasawara | 709/207 |
| 6,073,106 A | * 6/2000 | Rozen et al. | 705/3 |
| 6,185,614 B1 | * 2/2001 | Cuomo et al. | 709/224 |
| 6,199,164 B1 | * 3/2001 | Nishimoto et al. | 713/200 |
| 6,236,971 B1 | * 5/2001 | Stefik et al. | 705/1 |
| 6,237,786 B1 | * 5/2001 | Ginter et al. | 213/153 |
| 6,253,193 B1 | * 6/2001 | Ginter et al. | 705/57 |

* cited by examiner

GENERAL ART

COMMUNICATION METHOD AND SYSTEM UTILIZING A SPECIFIC COMMUNICATION CODE UNIQUELY ASSIGNED TO THE DATA RECORD

FIELD OF THE INVENTION

The present invention is in the field of communication techniques and relates to a communication method and system utilizing a specific communication code.

BACKGROUND OF THE INVENTION

When people meet for business purposes, it is commonly practiced to exchange business cards containing relevant information for future contacts. A business card usually contains data pertaining to the following: name, occupation, company, position and addresses relative to communication systems such as mail, phone, fax, e-mail and the like.

Business cards gathered from other parties are usually kept for the purpose of exchanging information or in the expectation of performing various transactions. The assumption is that the parties involved will use the addresses for establishing future relations that may result in business dealings. Since the information held in the business cards is of importance, they are carefully filed and ordered. Usually, the data of the cards is painstakingly typed, or scanned, to create computer files that are easier to maintain. It is needless to say that the handling and filing of business cards is cumbersome and time-consuming.

As time passes, it is usual for changes to occur in at least some of the data contained in a business card. Although names tend to remain the same, positions, occupations and many kinds of addresses are modified quite often. For example, a person may be promoted to a higher position in another division, may leave for another company or, as frequently occurs, a phone, facsimile or e-mail address is modified. These are all "dynamic" changes that take place in everyday life.

Thus, data printed on the business card remains valid only until changes take place in any one of the many data it displays. Therefore, as a result of these changes, it often becomes difficult to communicate with other parties.

Such changes compel the owner of the business card to print a new version of the card, and then to distribute it to his contacts. It would therefore be advantageous to all sides to provide the receiver of a business card with the latest edited version of the card, whenever such editing occurs. However, such an endeavour would require the card owner to send a new card to all his previous contacts each time modifications are made, assuming that it were possible to recall to whom they were distributed originally, and further assuming that the addresses of these receivers have not undergone any change themselves. In practice, both assumptions make such a task only partly achievable, at best. Even if so, the data receiver would still be left with the burden of filing the edited versions of the cards as they arrive.

Quite frequently, names and addresses are published in listings or in public, such as in telephone books and in various advertisements, without any knowledge regarding those who had initially been receivers of the data. In such instances, it is completely impossible to even try to approach the receivers, and there are no easy ways to notify these receivers of the fact that changes have occurred.

Various personal communication techniques have been developed. U.S. Pat. No. 5,717,863 discloses a communication technique aimed at timesaving in retrieving personal information for real-time processes such as a conference call. The technique utilizes a business card in the form of a data structure comprising information commonly found in business cards, and the particular user's PC conference connection address. To contact a certain person, a user must search for the addressed person's name in the list and, upon finding him, the user will receive a "card image" on his display. It is evident that this technique suffers from the following drawbacks. On the one hand, it obliges the user to establish an on-line connection with a server containing the data structure for searching. On the other hand, it provides no privacy for a card owner, since once he has designed and stored his "business card image" in the data structure, his name appears in the list, and anyone can have access to unload his personal data.

Another communication technique is proposed by the Internet site "PlanetAll", and is based on managing a personal address book. PlanetAll acts as an Internet Service Provider owning a central database for maintaining a personal address book. Each subscriber to PlanetAll is allowed to create his personal address book in the central database. Upon mutual consent of a first subscriber and a second subscriber to PlanetAll, the contact particulars of the first subscriber are transmitted from his address book to the address book of the second subscriber. Additionally, the address book of the second subscriber is automatically updated with the relevant changes whenever they occur in the address book of the first subscriber. All these address books reside within the central database belonging to PlanetAll. Thus, each PlanetAll subscriber has his personal address book maintained at the Service Provider's side. Consequently, to gain access to his personal address book, the subscriber needs to establish an on-line connection with the Service Provider. Moreover, to obtain permission of one of the subscribers for the automatic transmission of his contact particulars to another subscriber, the Service Provider has to invoke a specific procedure. With the Internet, the User Resource Locator (URL) is typically utilized to present up to date information to receivers. This technique suffers from numerous drawbacks, as it always requires the active intervention of the user, the time consuming process of getting on-line, accessing addresses and waiting for the results.

The Internet site "ICQ" proposes a communication technique developed by Mirabilis Ltd. This technique utilizes a Client Program and a central database, and is aimed at facilitating on-line communication (e.g., Internet Chats, messaging, etc.) between subscribers to ICQ. Once a "first subscriber" to the Internet downloads the ICQ Client Program to his personal computer and thereby becomes a subscriber to ICQ, each time he goes on-line, he will be provided with an indication that a "second subscriber" is also on-line at that time. This "second subscriber" (or more than on subscriber) is previously selected (chosen) by the "first subscriber" and recorded as associated with the "first subscriber" for further indications to the "first subscriber". Additionally, ICQ allows any subscriber thereto to create and operate his own personal address book. This address book includes personal data of other subscribers to ICQ, per the choice of the owner of the address book. The address book is created at the subscriber side (i.e., in his personal computer), and can be updated with any changes in the personal data of those subscribers who are recorded in the address book.

However, to perform this updating, the address book owner needs to go on-line for accessing the ICQ central database. In other words, the updating procedure is carried out in response to a specific request from the address book owner. This technique does not allow for managing the personal address books of ICQ subscribers by the central database. As a result, any subscriber, before using personal data recorded in his address book for contacting a corresponding subscriber, has to check the actuality of data stored in the address book by establishing an on-line connection with the central database through the Internet.

SUMMARY OF THE INVENTION

There is accordingly a need in the art to improve communication techniques, in particular, so-called "keeping in touch" techniques, by providing a novel communication and updating method and system utilizing a communication code.

It is a major object of the present invention to provide such a method that allows any receiver of a communication code to obtain corresponding information belonging to the owner of this communication, and successfully contact the code owner in a very simple and convenient way, whenever the code receiver desires, even if a significant amount of time has passed from the date he received the code.

It is a further object of the present invention to provide such a system which in most cases frees both the code owner and the code receiver from the need to purchase any equipment in addition to that usually provided at an individual's home or office.

It is a still further object of the present invention to allow the code owner to select what information he wishes to deliver and to whom, and keep the information receivers up to date of all changes introduced by the code owner to the information.

The present invention takes advantage of the fact that the world is undergoing a so-called "communication revolution". More people worldwide are provided with personal Digital Communication Devices (phone device, computers, pagers, PDAs) connected to one or more networks. Accordingly, an individual typically has several personal communication addresses that have to be maintained. Furthermore, each individual has to manage a growing list of addresses of persons with whom contacts have to be maintained. Each record of individual's personal data, typically presented on his business card contains increasing amount of information, such as his telephone number, mobile phone number, fax number, E-mail and mailing addresses, etc. All this information has to be stored, manually entered into the individual's personal address book, and manually updated later on in each of his personal digital communication devices. With this technique, information in the personal address book is definitely rarely up to date, because the details of this information is dynamically changing. Keeping the information stored in personal address books up to date in an automatic and transparent manner to the user, is a very important component of the entire communication process.

Thus, the main idea of the present invention consists of the following. Most people today have business cards, especially those performing specific functions in companies. People exchange their business cards whilst meeting each other and wishing to communicate in the future. A card owner desires a card receiver to whom he has delivered his business card to have a simple way of "keeping in touch". To this end, an individual or any other authorized person creates the individual's own data record containing his personal information or any other information he wishes to deliver to others, for example, that typically contained in a business card: name, position, mail address, fax and telephone numbers, Email, etc. This data record may comprise an attachment, for example a file containing a text and/or picture. The data record, or the address where this data record is maintained, is stored in the database of a manager utility. The individual receives a unique communication code generated by the manager utility, thereby becoming the "code owner". The code owner applies his own communication code to his business card, letter-head, or the like, and delivers it to people with whom he wishes to "keep in touch". An individual who was given the unique communication code (for example, issued on the business card of the code owner) becomes the "code receiver". The communication code serves as the address of the specific data record maintained in the database of the manager utility. Hence, the code receiver may use this address to obtain the code owner's information entered in the corresponding data record. Obviously, an individual may be the owner of several communication codes corresponding to different data records belonging to him.

The code owner, as well as the code receiver, typically has at least one personal communication unit at his disposal, for example, a personal computer or a phone device. Such a personal communication unit is typically a node of at least one popular network. Indeed, every phone device is associated with a Telephone Company, while almost every computer is connectable to the Internet by means of an Internet Service Provider (ISP). The telephone network may be "Public Switched Telephone Network" (PSTN), or the "Integrated Service Digital Network" (ISDN). The main principles of these types of telephone networks are known per se, and therefore need not be described in detail, except to note the following. PSTN is a communication common carrier network that provides voice and data communication services over switched lines. ISDN is a type of digital end-to-end telecommunication network, that supports multiple services, including voice and data. ISDN lines can transmit digital data as well as voice without a modem. ISDN is used in public and private network architectures.

The term "manager utility" used herein signifies software and/or hardware installed at remote communication devices connectable to each other through a communication link. This utility is capable of utilizing hardware and software typically installed in the corresponding communication device for creating and/or managing a database in a memory of this device. These communication devices may be either personal communication devices, or personal communication devices and server utilities of corresponding networks.

The system allows each code owner to be aware of all his associated code receivers. Additionally, the system, on the one hand, allows the code owner to keep his data record up to date, and, on the other hand, automatically updates the registered receivers associated with this specific code with all the changes made. The system enables the code receiver, as well as the code owner, to create their own private databases. Each private database may be stored in the memory of the personal communication unit of the respective user, in the central database or in both.

To enjoy all the advantageous features of the present invention, the code owner, as well as the code receiver, should have a predetermined software package ("User Program") installed in his personal communication unit, for example by downloading this software package from the network (e.g. the Internet). If a phone device serves as a communication unit, it should be of the so-called "smart type" equipped with a certain programming/interface utility, for example in the form of a chip with an embedded application, such as a known Single In-line Memory Module (SIMM). Such a smart-type phone device can be used as both a phone and portable computer capable of running a suitable application, which is the predetermined "User Program" for the purposes of the present invention.

The manager utility may be a central database manager associated with the network's server. In this case, in order to store the data record in the central database and to receive the communication code assigned to him by the central database manager, the code owner connects to the central database manager via the network. The code receiver, in order to obtain the information presented on the received business card, in the most convenient and available manner, accesses the central database manager from his personal communication unit through the network. The manager transmits the information included in the requested data record to the code receiver, and registers the code receiver in the central database as a receiver associated with this specific code owner.

The private database may be maintained only at the corresponding user's side (i.e., in his personal communication unit). In this case, the User Programs, installed in the communication units, by themselves may serve as the manager utility.

In a case that some of the users prefer to have their private databases maintained in their personal communication units only, and others prefer to utilize the central database for this purpose, the User Programs, together with the central database manager, serve as the manager utility.

There is thus provided according to one aspect of the present invention, a communication method between an owner of at least one communication code and a receiver of said at least one communication code utilizing a manager utility, the method comprising the steps of:
at the code owner side:
  (a) creating a data record containing information belonging to the code owner, and feeding said data record to the manager utility,
  (b) receiving the at least one communication code associated with at least a predetermined part of the information included in said data record;
at the code receiver side, upon receiving said at least one communication code:
  (c) feeding said at least one communication code to the manager utility;
  (d) receiving data representative of said at least predetermined part of the information contained in the data record of the code owner;
at the manager utility:
  (e) upon the receipt of said data record, storing it and assigning said at least one communication code to the data record owner;
  (f) upon the receipt of said at least one communication code from the code receiver, transmitting at least said predetermined part of the stored information of the code owner to said code receiver.

Preferably, the code receiver and the code owner have their personal communication devices, which are nodes of a network. According to one embodiment of the invention, the manager utility is a central database manager associated with a server utility of this network. The central database manager belongs to either the network's server of to an additional Service Provider (SP) coupled to the network's server. According to another embodiment of the invention, User Programs installed in the personal communication devices constitute the manager utility.

According to another aspect of the present invention, there is provided a communication system utilizing a network having a server utility and communication units associated with different network subscribers, the system comprising a central database manager associated with said server utility, wherein
  the central database contains data representative of a plurality of data records, each data record containing information belonging to the corresponding subscriber and being associated with at least one communication code assigned to at least a predetermined part of the information of the corresponding subscriber who is the owner of said at least one code;
  the central database manager comprises:
    a communication utility that receives data addressed to the central database and transmitted through said network, and transmits data from said central database to a corresponding one of said communication units through the network;
    an identification utility coupled to said communication utility for identifying said data addressed to the manager as a certain request to the central database; and
    a central processor utility that is coupled to the communication utility and to the identification utility, and is associated with said central database, the central processor utility being responsive to the request data for generating data representative of said at least predetermined part of the information included in the corresponding data record, when the request data is representative of said at least one communication code, and, when the request data is representative of the data record, for storing the information included in the data record in the central database and assigning said at least one communication code to the corresponding subscriber.

The network may be either a computer or a telephone network, or a combination of both. The subscriber's communication unit may be a personal computer, a phone device or the like.

The data record may have more than one corresponding communication code, For example, the code owner designs his data record having several information parts, and decides to deliver different parts to different persons. This is implemented by assigning to each information part its own communication code. More than one communication code could be applied to the same business card. For example, one such communication code may be a so-called "business code", associated with the position of the code owner in a company he works, and the other communication code may be a so-called "personal code", associated with the personal data of the code owner, irrespectively of his position in the company.

According to yet another aspect of the present invention, there is provided a communication system for providing communication between first and second subscribers to a network, the system comprising:
  a personal communication unit of the first subscriber and a personal communication unit of the second subscriber, the first and second units being connectable to each other through the network; and
  a manager utility including a first software package installed in the first personal communication unit and a similar, second software package installed in the second personal communication unit, wherein
    the first software package is responsive to data coming from the network and addressed to the first communication unit, so as to selectively generate corresponding notification messages to the first subscriber, to manage a private data base of the first subscriber, and to transmit predetermined data from the private database of the first subscriber to the second subscriber, and is responsive to data entered into the personal communication unit of the first subscriber to assign at least one communication code to the first subscriber;

the second software package is responsive to data coming from the network and addressed to the second communication unit, so as to selectively generate corresponding notification messages to the second subscriber, to manage a private data base of the second subscriber, and to transmit predetermined data from the private database of the second subscriber to the first subscriber, and is responsive to data entered into the personal communication unit of the second subscriber to assign at least one communication code to the second subscriber.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
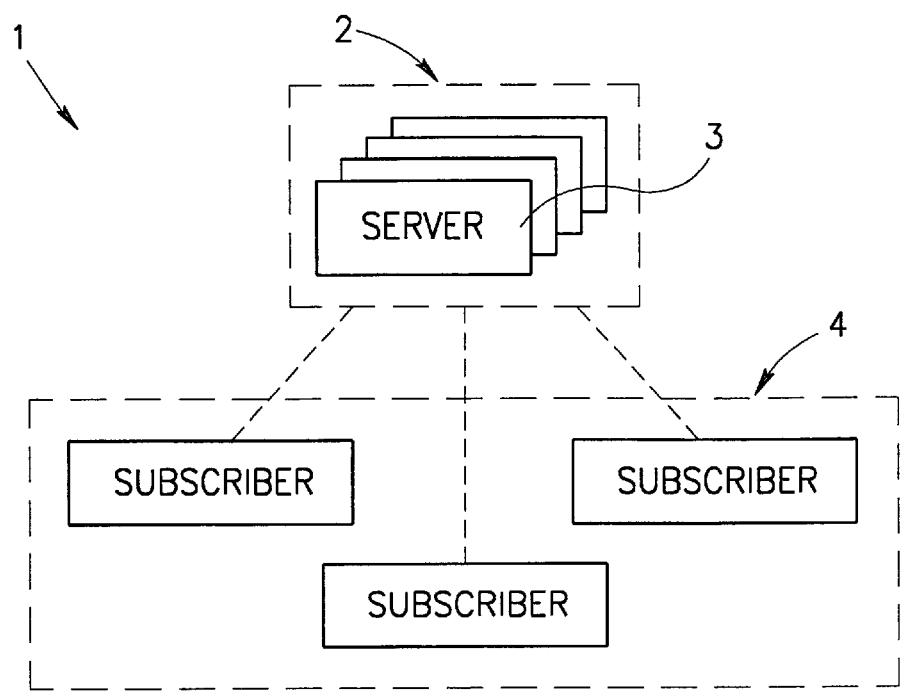
FIG. 1 is a schematic block diagram of the main components of a conventional communication system.

Referring to FIG. 1, there is illustrated a conventional communication system, generally designated 1, representing a network formed by Service Providers (SP) sides 2 and a plurality of subscriber sides 4, each connected to the SP side 2 through a communication link. Such a network may be a computer network, for example the "INTERNET", or a telephone network, the SP side 2 being associated with Internet Service Providers or Telephone Companies, respectively. Each server 3 of the SP side 2 is typically a central computer station representing a local area network (LAN), and is typically connected to a plurality of remote servers (LANs) 3 through the communication link. Each such server 3 is associated with various databases, which can be accessed by each subscriber of either server 3. To receive a specific data record contained in the database, the user at the subscriber side 4 establishes an on-line connection with his local SP side 2, in accordance with a protocol between a so-called "Server Program" and "Client Program" installed at the server and subscriber sides, respectively. The principles of the network's construction and operation are known per se.

Figure 2A:
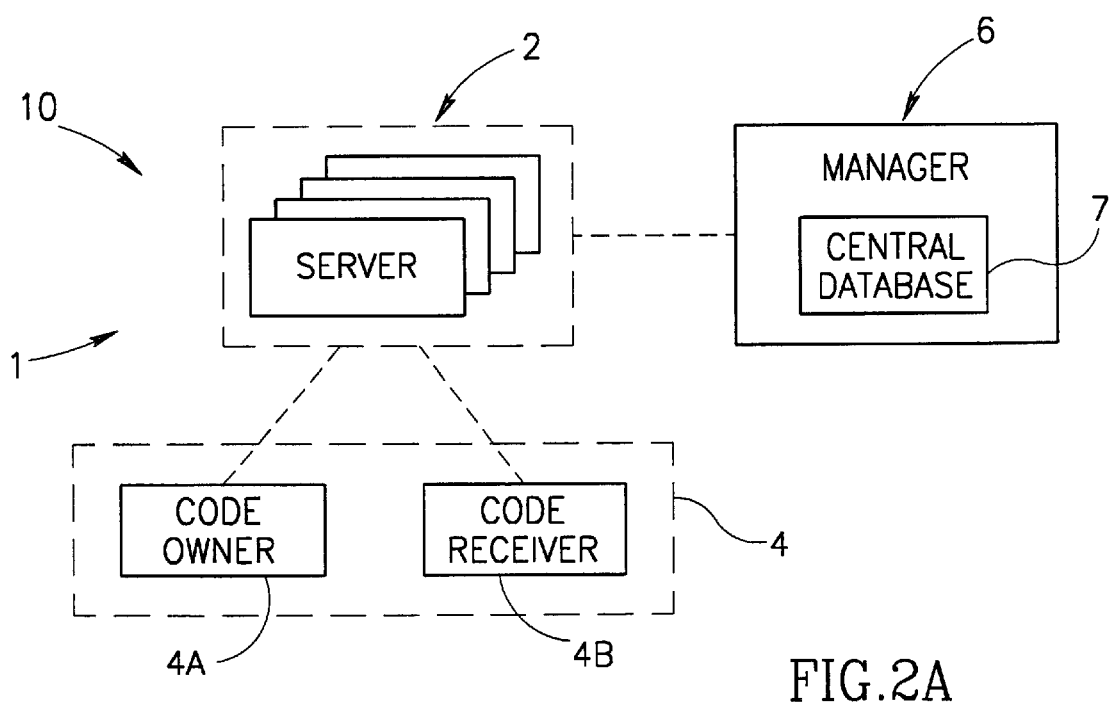
FIG. 2a is a schematic block diagram of the main components of a system, constructed according to one embodiment of the invention.

FIG. 2a illustrates the main components of a communication system, generally designated 10, constructed and operated according to one embodiment of the invention. Same reference numbers are used for identifying those components, which are identical in the systems 1 and 10, to facilitate understanding. As shown, the system 10 comprises the network 1 as its constructional part, and a manager utility 6. In this specific example, the manager utility 6 functions actually similar to one of the servers 3 being couples to the SP side 2 through a communication link, and manages a central database 7. Alternatively, although not specifically shown, one of such servers can function as the manager 6 managing the database 7. In the system 10, the subscriber side 4 is composed of so-called "owner" and "receiver" sides 4a and 4b, respectively.

The terms "owner" and "receiver" signify different network's subscribers (users) who are, respectively, the owner and receiver of a specific communication code $C_{com}$. Practically, each subscriber can be the owner with respect to one specific communication code, and the receiver with respect to another specific code. Such a communication code $C_{com}$ belongs to the code owner, and is assigned to at least a predetermined part of information belonging to the code owner and included in a data record designed by him or by an authorized person on his behalf. In this specific example, the data record is maintained at the manager side 6 (i.e., in the central database 7), as will be described more specifically further below. The system 10 is aimed at facilitating so-called "keeping in touch" between the code owner and the coded receiver by utilizing this specific code $C_{com}$.

The communication code $C_{com}$ presents access to the central database manager 6. This access results in the automatic transmission of the information contained in the corresponding data record (or a predetermined part of the data record) from the central database to a private database of that user who has accessed the manager side 6 by means of the communication code $C_{com}$, as will also be described more specifically further below.

Figure 2B:
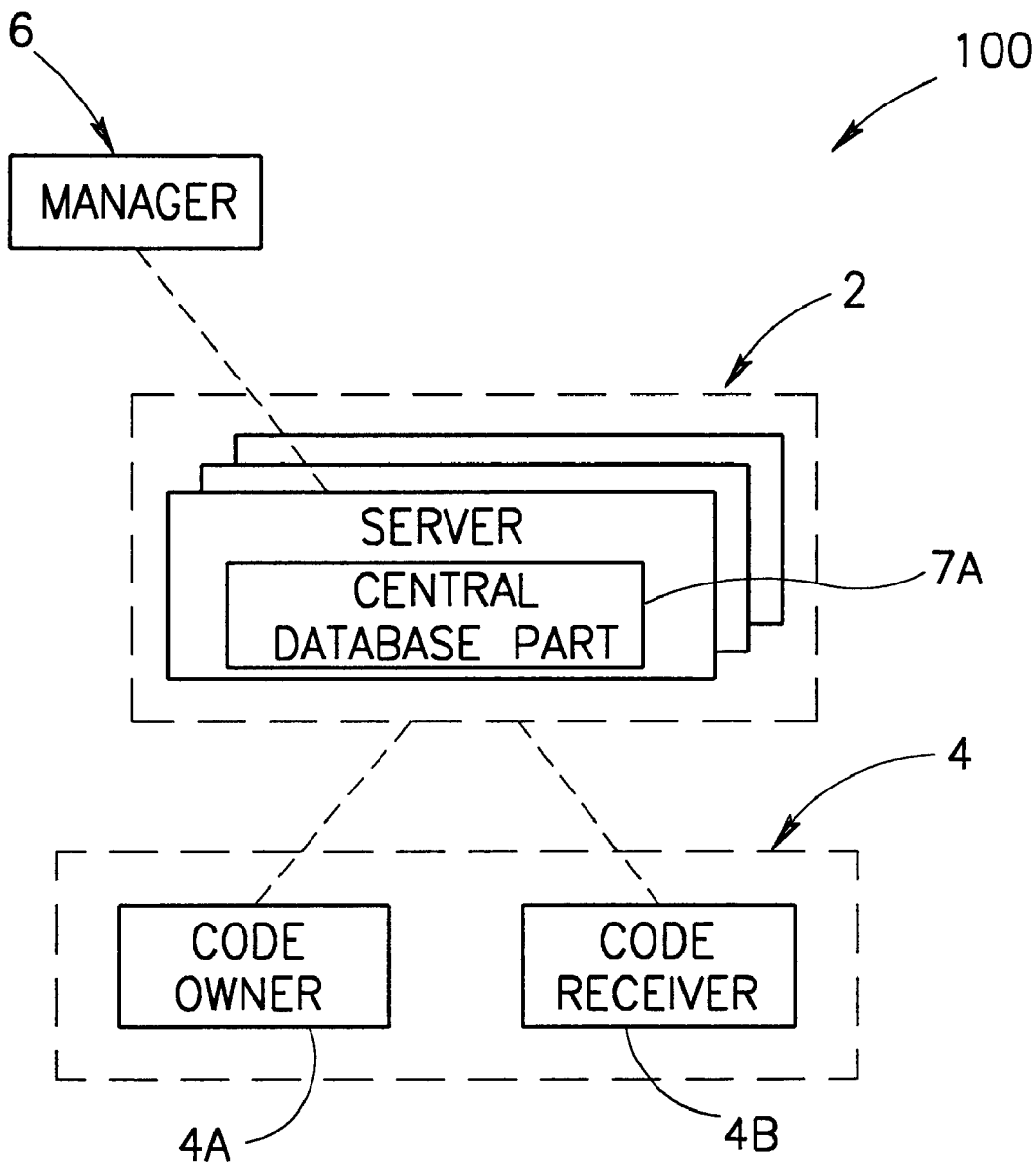
FIG. 2b is a schematic block diagram of the main components of a system, constructed according to another embodiment of the invention.

FIG. 2b illustrates a communication system 100 according to another embodiment of the invention. The system 100 is constructed generally similar to the system 10, but comprises a so-called "distributed database". In other words, each local server 3 owns a part of the central database 7a, for example containing those data records or parts of data records which are associated with its local subscribers.

Figure 3:
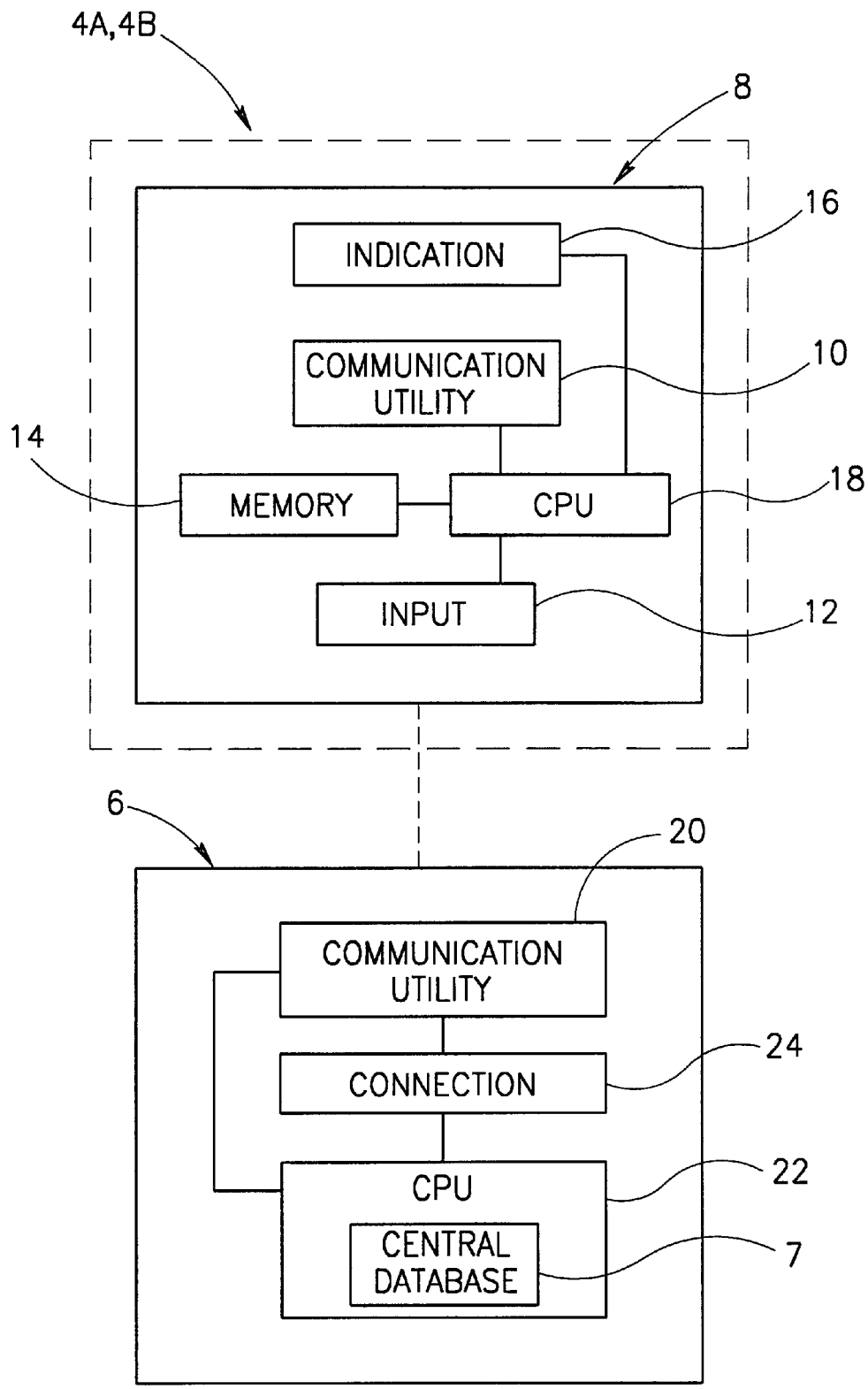
FIG. 3 schematically illustrates the main utilities of a subscriber's communication unit and of a central database manager used in the system of either of FIGS. 2a and 2b.

Referring to FIG. 3, the subscriber side 4a (or 4b) comprises a communication device 8 that has inter alia the following utilities: a communication utility 10 (e.g., modem), an input means 12 (e.g., keypad, microphone), a memory 14, an indication means 16 (e.g., display, speaker), and a central processor utility (CPU) 18.

The owner and receiver sides 4a and 4b are the subscribers of the network 1 and are associated with either the same server or different remote servers of the SP side 2. The communication device 8 may be a personal computer. In this case the network's "Client Program" is duly installed in the CPU 18, and a specific software package, a so-called "User Program", is either already installed or can be easily installed in the CPU 18, for example by means of downloading the program through the network (e.g., the Internet). This software package operates in accordance with the principles of the present invention, as will be described more specifically further below. If User Program is installed in the communication device 8, the User Program together with the central database manager serve as the manager utility.

Alternatively, the communication device 8 may be a phone device of the so-called "smart type", namely equipped with a programming/interface utility for running the "User Program" (application). The provision of such a programming/interface utility enables the phone device to be used as both the phone and portable computer or personal digital assistance (PDA). If a wireless phone device is considered, such a programming/interface utility may be in the form of a chip with an embedded application to be mounted in the phone device, such as the known "Single In-Line Memory module" (SIMM). In the case of a regular "wired" telephone device, a separate electronic unit may be interconnected between the communication link and the telephone device. The communication utility of the phone device is provided with an identification means, the so-called "Caller ID" function.

When identifying that received signals come from the manager 6, the communication utility, instead of generating a call (i.e., actuating the phone ringer) actuates the CPU 18 for running the "User Program". Alternatively, a separate data link may be provided for transmitting data from the manager 6 to the phone device 8. In other words, the present invention may be used with either the "Public Switched Telephone Network" (PSTN) or the "Integrated Service Digital Network" (ISDN). Thus, the CPU 18 of the communication device 8, which may be smart-type phone or a personal computer, is preprogrammed with the specific software package ("User Program"). This software package actually presents a "Client Program" associated with a certain Application Program Interface (API) installed in the CPU 22 of the manager side 6. The "User Program" is capable of creating and/or managing a private database in the memory of the device 8, as will be described more specifically further below. It should be noted that if a simple phone device is used having no such programming/interface utility, relevant data may still be transmitted from the server utility to this phone device being presented to the user as text or voice messages.

As further shown in FIG. 3, the manager 6 is typically a server computer station, which comprises inter alia the following utilities: a communication utility 20, a CPU 22 having an appropriate application program interface (API), and a connection utility 24. The communication utility may be of a so-called "MODEM POOL" type, i.e. comprising a large number of modems having a Caller ID detection feature so as to identify the subscriber's communication unit that has initiated the connection.

Figure 4:
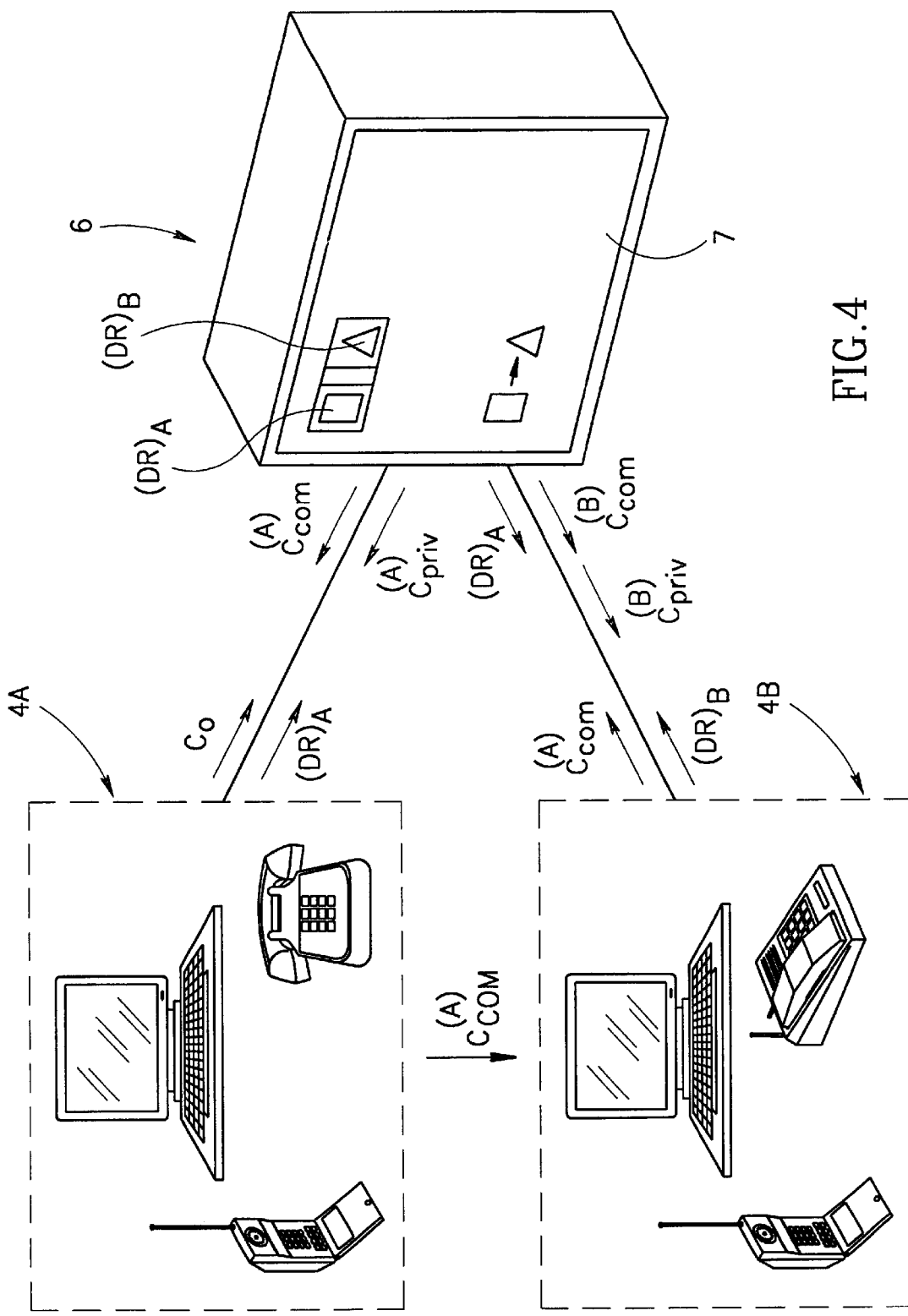
FIG. 4 is a schematic illustration of the main operational principles of the system of either of FIGS. 2a and 2b.
Figure 5A:
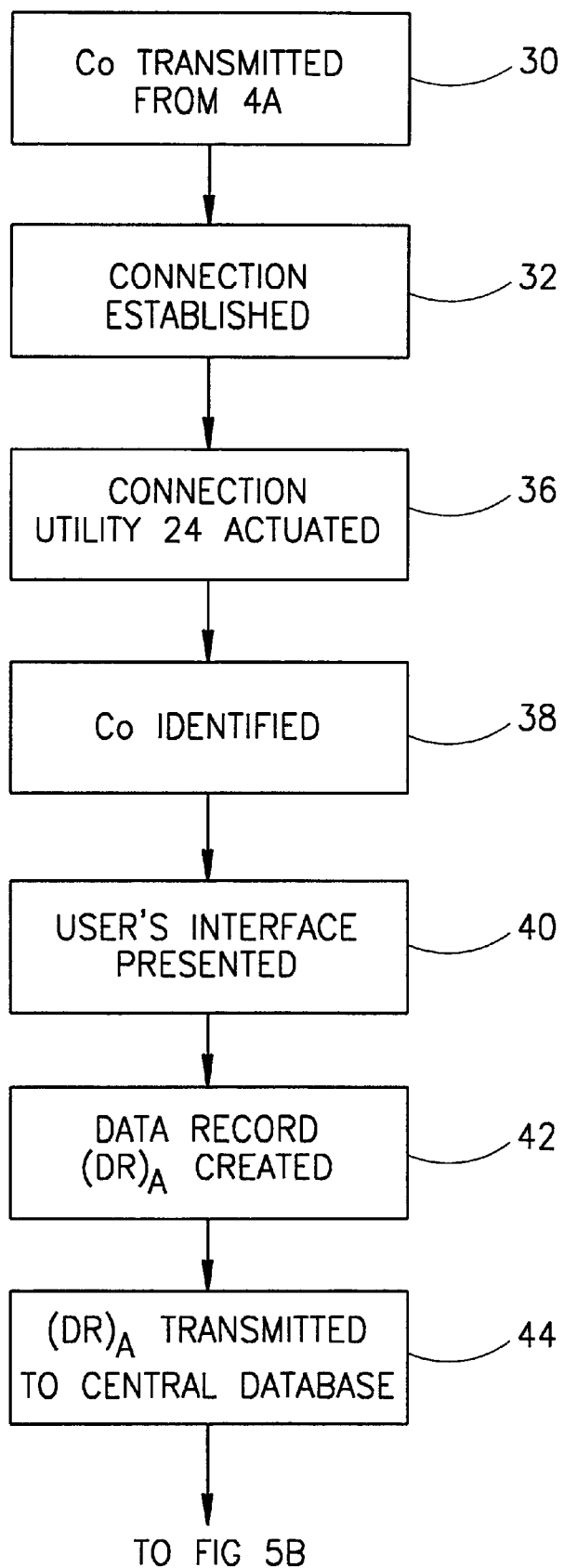
FIGS. 5a and 5b illustrate a flow diagram of a part of the operation of the system of either of FIGS. 2a and 2b.
Figure 5B:
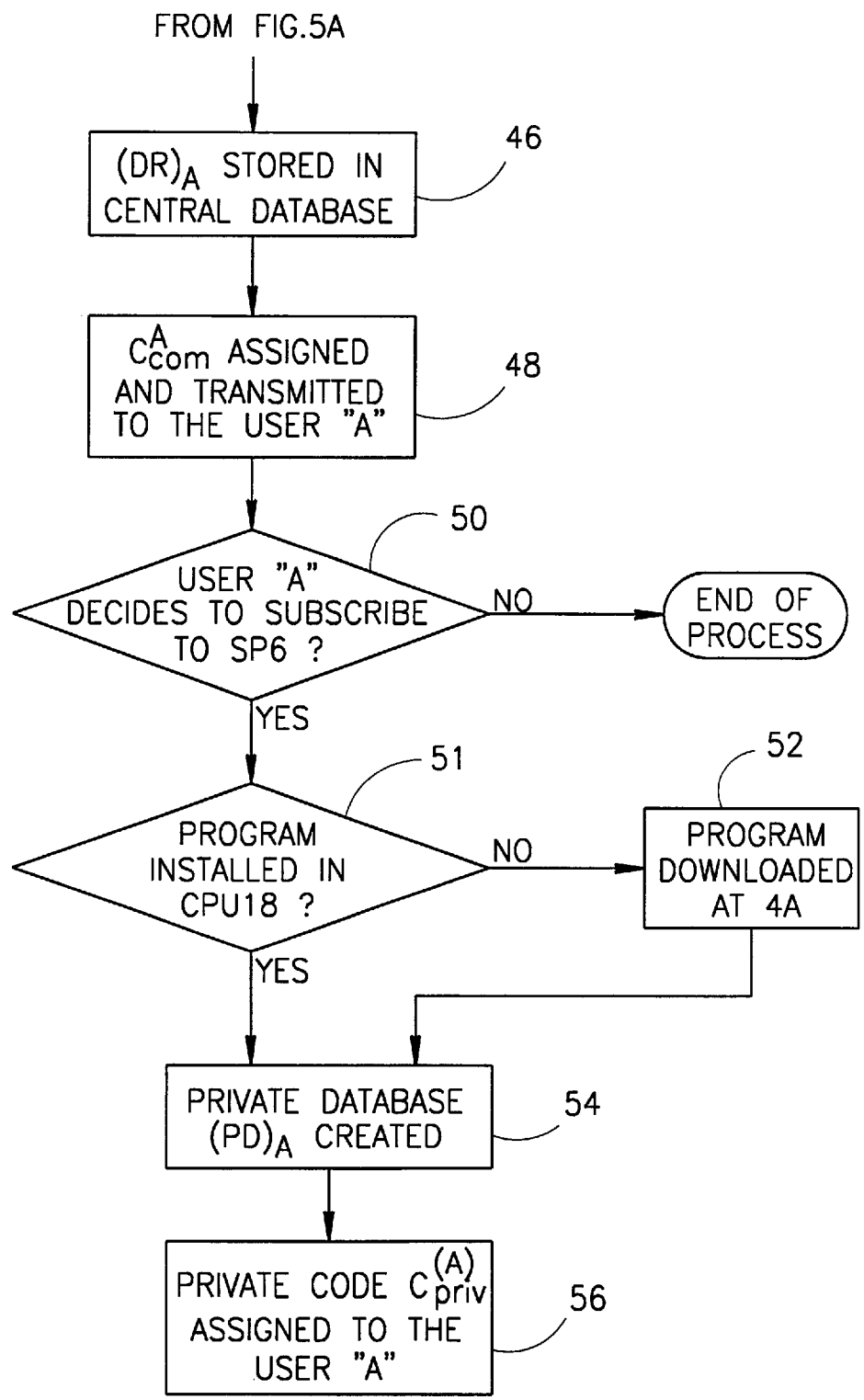

FIGS. 4 and 5a–5b illustrate a part of the operation of the system 10 initiated by a user A at the subscriber side 4a of the network 1 in order to become the owner of a communication code $C_{com}$ and, optionally, to subscribe to the central database manager 6. User A accesses the manager side 6 either by inputting an address code $C_0$ of the central database manager 6 via the network's "Client Program" installed in his personal computer, or by dialing the manager's phone number $C_0$ from the user's phone device (step 30). Generally speaking, this code $C_0$ if the network's address of the manager 6. The on-line connection between the subscriber side 4a and the manager side 6 is established through the SP side 2 (step 32). The modem 20 receives the incoming data and actuates the connection utility 24 (step 36). The received data (e.g., $C_0$) presents requested data to be identified by the connection utility 24 (step 38). The access through the code $C_0$ signifies that user A at the side 4a wishes to carry out the following:

create his own data record $(DR)_A$ to be stored in the central database 7, and obtain his communication code $C^{(A)}_{com}$; and, optionally, subscribe to the manager side 6 for creating and/or managing a private database $(PD)_A$ in the memory 14 and for obtaining his own private code $C^{(A)}_{priv}$.

Once receiving the private code $C^{(A)}_{priv}$ assigned to him, user A will use this private code for accessing the manager 6. In response to the receipt of the code $C_0$, the CPU 22 presents a user's program interface to the communication unit 4a (step 40), thereby enabling user A to create the data record $(DR)_A$ (step 42) and to transmit it to the manager side 6 (step 44) to be stored in the central database 7 (step 46). This having been accomplished, the CPU 22 assigns a unique communication code $C^{(A)}_{com}$ to this specific user A (step 48) who thereby becomes the "code owner". The communication code $C^{(A)}_{com}$ may be associated with the entire information included in the data record $(DR)_A$. Alternatively, the data record may contain several portions of information, each associated with a different communication code, as will be described more specifically further below.

It should be noted that, theoretically, in order to create such a data record in the central database and to receive at least one communication code, the user does not necessarily have to use the on-line means. He may design the data record and transmit to the manager side 6 in any other known manner (e.g., mail, fax), and, accordingly, may receive a notification message containing at least the communication code via mail or facsimile transmission. However, as indicated above, every personal phone device, as well as every personal computer, is typically a node of a network, either a telephone network or a computer network. It is not an exaggeration to say that most people have at their disposal at least one of such nodes.

The user's program interface also presents an option to the user to register as a subscriber to the central database manager 6 (step 50). If the user chooses to subscribe to the manager, he actuates a corresponding key, e.g. he "clicks" the appropriate position on the displayed representation of the program interface. For this purpose, his personal communication device has to be loaded with the "User Program" (step 51). If the communication device 8 is a personal computer and if such a software package has not yet been installed therein, the software package may be downloaded in response to the key actuation (step 52). As indicated above, the "User Program" is capable of creating and managing a private database $(PD)_A$ in the memory 14 (step 54), or of managing an existing private database, if any.

Additionally, the choice to subscribe to the central database 7 results in that the CPU 22 generates a unique private code $C^{(A)}_{priv}$ and assigns it to this specific user A (step 56). User A becomes the owner of both the communication code $C^{(A)}_{com}$ and the private code $C^{(A)}_{priv}$. User A may deliver the communication code $C^{(A)}_{com}$ to other parties (code receivers), and may apply the private code $C^{(A)}_{priv}$ to amend (edit) his data record in the central database 7.

Figure 6A:
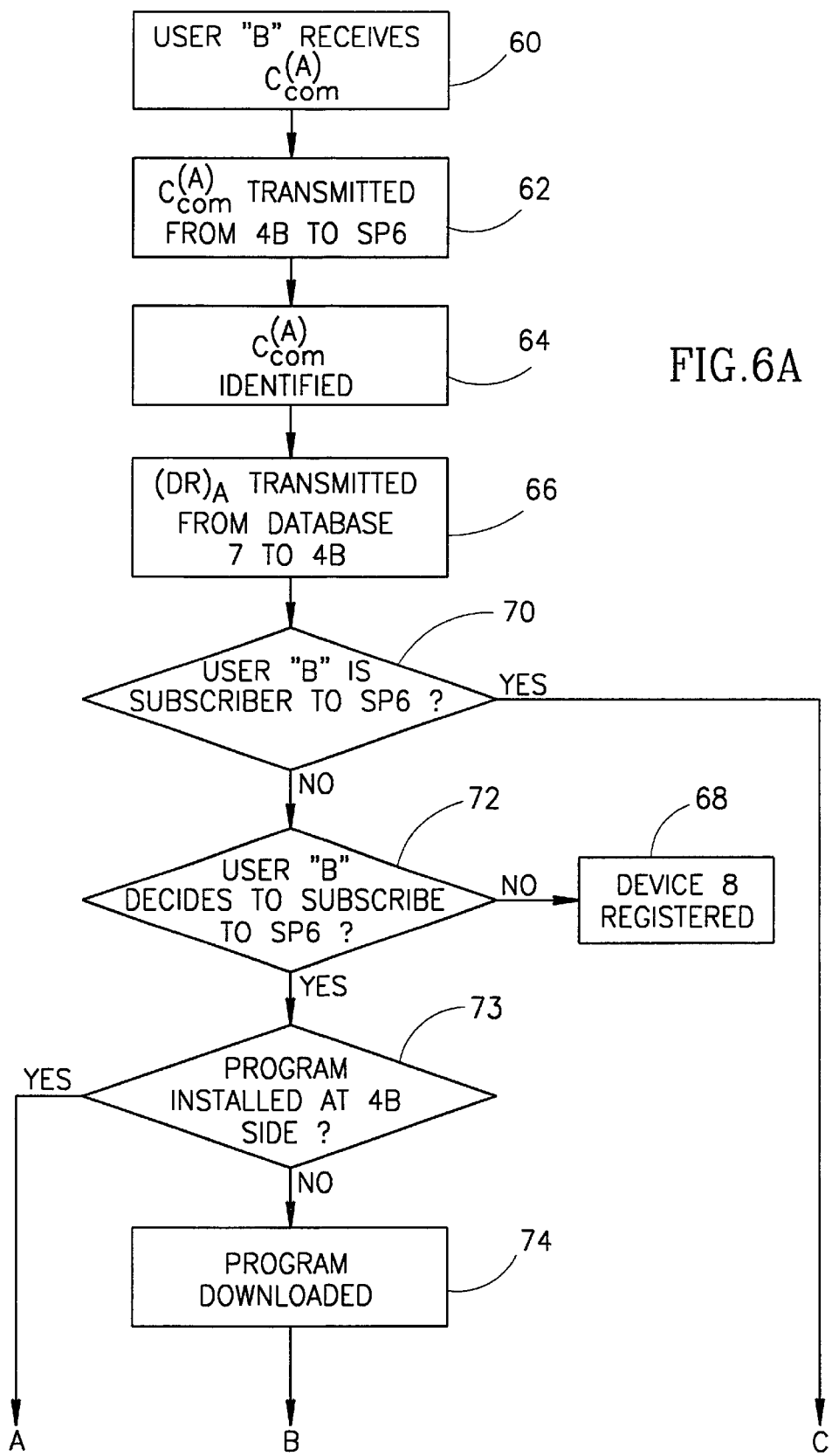
FIGS. 6a and 6b illustrate a flow diagram of another part of the operation of the system of either of FIGS. 2a and 2b.
Figure 6B:
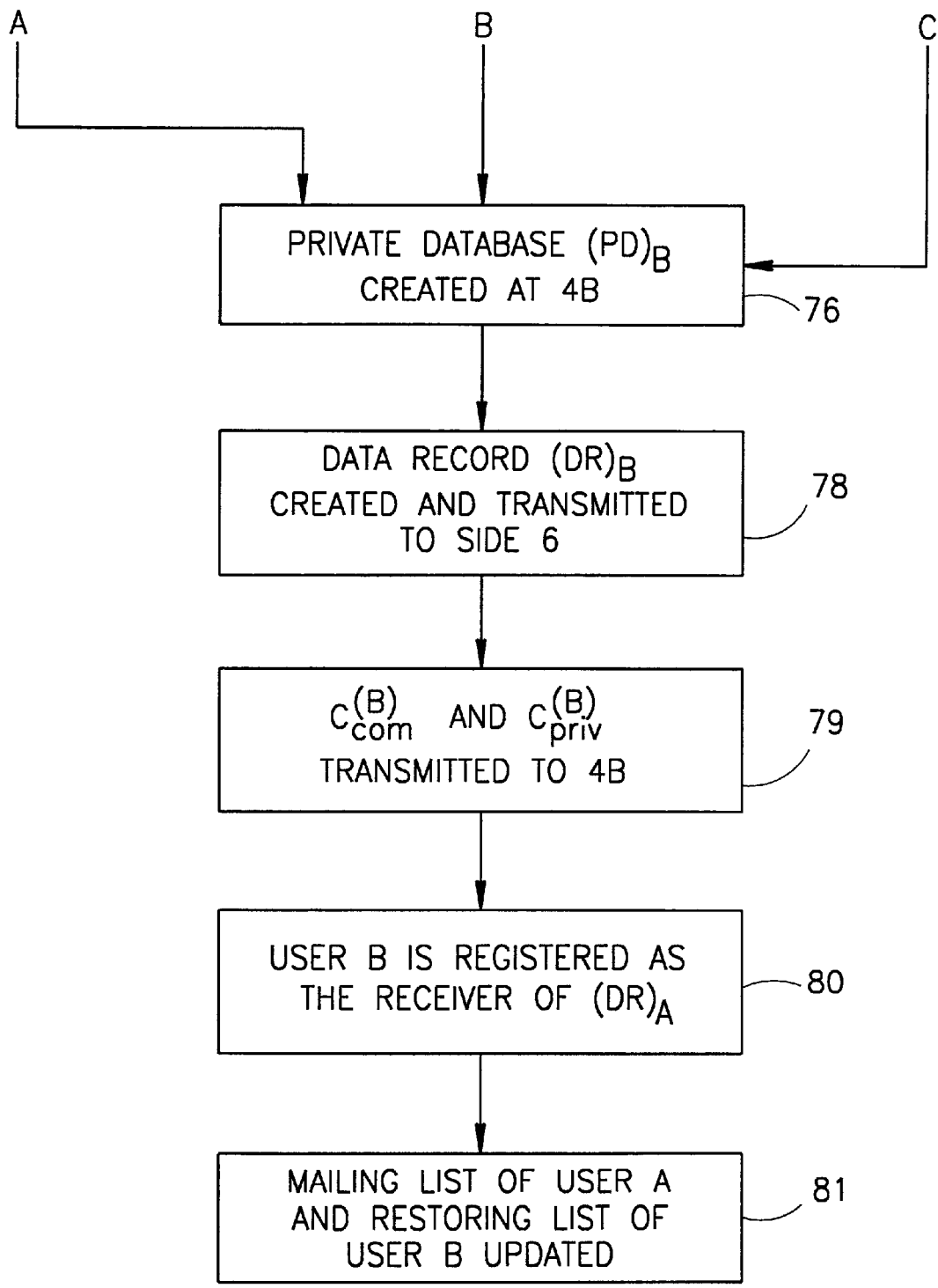

A user B who was given the communication code $C^{(A)}_{com}$ is considered as the code receiver. As further shown in FIG. 4 and is illustrated in a flow diagram of FIGS. 6a and 6b in a self-explanatory manner, user B, upon receiving the communication code $C^{(A)}_{com}$ (step 60), could apply this code $C^{(A)}_{com}$ to carry out the following:

access the manager 6 (step 62) to request and obtain information included in the user's A data record (DR)$_A$ or a predetermined part thereof, as the case may be (step 64);

and, optionally, upon deciding to subscribe to the manager 6 (step 72)

create his private database (PD)$_B$ (step 76), and have the requested information included in the data record (DR)$_A$ or in the part thereof stored in the private database (PD)$_B$; and/or create his own data record (DR)$_B$ (step 78) to be stored in the central database 7, and obtain unique communication and private codes $C^{(B)}_{com}$ and $C^{(B)}_{priv}$ assigned to him (step 80).

The manager 6 operates in the following manner. Upon identifying the requested data, i.e. the communication code $C^{(A)}_{com}$ (step 64), the manager 6 transmits the requested information included in the data record (DR)$_A$ from the central database 7 to the communication unit of user B (step 66). CPU 22 determines whether user B is a registered subscriber to the central database manager 6 (step 70), for example, by allowing user B to enter his subscriber's information (e.g., $C_{priv}$ or any other client's ID) through the user's program interface. If no such data is entered, the user is invited to choose whether or not to subscribe to the manager 6 (step 72). To this end, the user's program interface includes all the necessary keys (icons) to be actuated by the user at his choice.

If user B decides to subscribe to the central database manager 6, then, depending on whether the "User Program" has or has not yet been installed in the personal computer 8 (step 73), the private database (PD)$_B$ is either directly created (step 76) or created after the "User Program" is downloaded (steps 74 and 76), respectively. Step 76 is optional, and necessary in cases when either no private database exists in the memory of the communication unit or the subscriber does not intend to use any existing private database for the purposes of the present invention (i.e. "keeping in touch").

Then, user B creates his data record (DR)$_B$ and transmits the same to the manager 6 to be stored in the central database 7 (step 78). Here, a communication code $C^{(B)}_{com}$ and a private code $C^{(B)}_{priv}$ are assigned to user B and transmitted to him through the network (step 79). Thus, user B receives his communication and private codes $C^{(B)}_{com}$ and $C^{(B)}_{priv}$.

The manager 6 registers the subscriber's information of user B (e.g., $C^{(B)}_{com}$, or any other relevant information per the user's preferences) as the receiver of the information included in the data record (or a predetermined part of this data record) of user A (step 80). Additionally, the CPU 22 of the manager 6 automatically generates a message to user A indicative of that user B has requested specific personal data of user A by means of the communication code $C^{(A)}_{com}$. This message is transmitted to a specific communication unit of user A (per his preferences) for updating a "Mailing List" of user A in his private database (PD)$_A$ (step 81). The "Mailing List" contains information regarding those subscribers who have requested and obtained personal data included in the data record (DR)$_A$ or a corresponding part thereof. A manner in which this message may be transmitted to user A will be described more specifically further below. Hence, each data record is associated with its owner, its corresponding "Mailing List" and corresponding communication code $C_{com}$ (i.e., the communication code of the owner).

It should be noted that user A could add an item relating to a specific user into his "Mailing List", without having this item received through the processing of the communication code $C^{(A)}_{com}$ fed by this specific user. It should also be noted that every subscriber may choose where to have his "Mailing List" stored, namely in his private database, in the central database of in both these databases.

To enable user A to identify user B, the corresponding message contains certain personal information of user B, specified as his preferences for information to be allowed for transmission in such cases (i.e., name, Email, phone number, $C^{(B)}_{com}$, etc.), as will be described further below with reference to FIG. 8. If user B, for any reason, declines the option to subscribe to the central database 7 or to at least advise any information to be included in the "Mailing List" of user A, the manager side 6 may, upon successfully identifying the network's address of the communication unit of user B, register this address as associated with the receiver of the personal data of user A (step 68).

Figure 7:
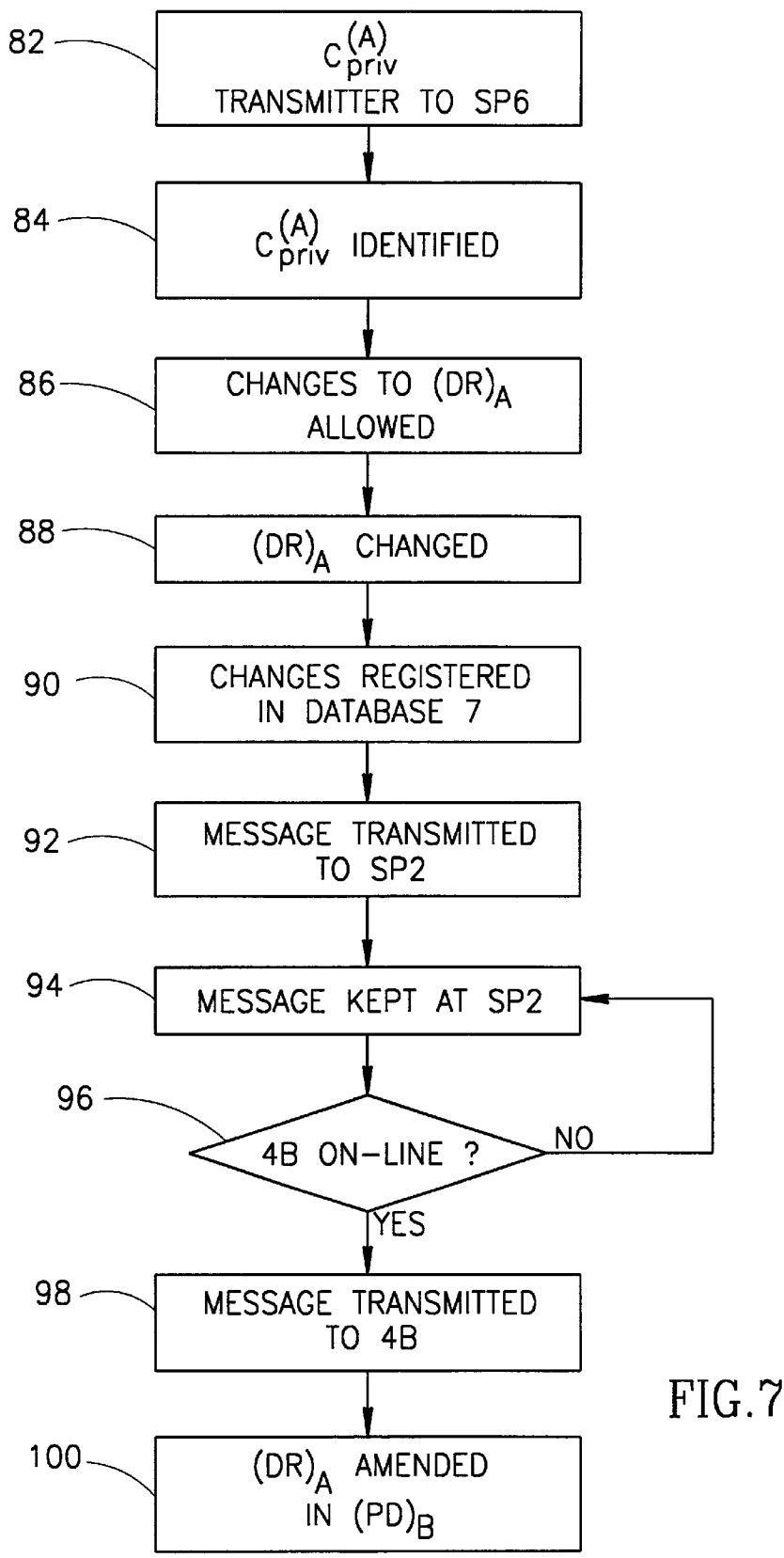
FIG. 7 illustrates yet another part of the operation of the system of either of FIGS. 2a and 2b.

Turning now to FIG. 7, the private code $C^{(A)}_{priv}$ of user A enables him to access the manager side 6 from any communication unit, which is the node of the network 1 (step 82). For this purpose, the manager 6 operates in the following manner. Upon receiving the private code $C^{(A)}_{priv}$ and identifying it as requested data (step 84), the manager 6 provides user A with the appropriate user's program interface and displays the data record (DR)$_A$ in a manner which allows the amendments to be made thereto (step 86). When user A completes the amending procedure (step 88), the CPU 22 operates a register these amendments in the central database 7 (step 90). Hence, the "old" data record of user A duly stored in the central database 7 is replaced by a "new" one. Optionally, the CPU 22 also maintains the old data record, and/or assigns a so-called "Time Stamp" to the changes made. It should be noted that, if the user's data record is maintained in his personal communication device, the user can make all necessary changes to this data record off-line, and then transmit these changes to the central database manager by using the user's private code $C_{priv}$.

The CPU 22 now operates in a manner to correspondingly update the data records residing with all the receivers of the communication code $C^{(A)}_{com}$, who have requested and obtained the corresponding information and are therefore registered in the central database 7 as associated with the amended data record (i.e. "Mailing List" of user A). The updating procedure may be implemented in the following manner.

A message, which is indicative of the changed data record of the code owner and is addressed to a specific communication unit of the code receiver, is automatically generated and transmitted to the SP side 2 (step 92). There, the message is kept until the appropriate utility detects that an on-line connection between the addressed communication unit and the SP side 2 (its local server) is established for any purposes (steps 94 and 96). Upon detecting the existence of such an on-line connection, the SP side 2 transmits the message to the addressed communication unit (step 98). To this end, CPU of the SP 2 and the CPU 22 of the manager 6 typically operate in accordance with a certain "protocol". The delay of transmission of such messages until the specific user initiates the on-line connection for any purposes, is aimed at preventing him from additional expenses associated with the on-line updating procedures.

According to one of the functions of the software package (i.e., "User Program") duly installed in the subscriber communication unit 8, this software is responsive to messages coming from the manager 6 (through the SP side 2) for replacing the old data record stored in the private database by the amended one or adding the amended data record to the old one (step 100).

It should be noted that time schedule for automatic message generation may be specified by a subscriber himself. For example, a corresponding message may be generated immediately after detecting any changes in or any request for information contained in the data record. Alternatively, such messages may be generated periodically, the time interval being preset by the subscriber. The periodic automatic updating procedure may be initiated by software installed either at the manager side ("Server Program") or at the subscriber side ("User Program"). If User Program initiates the updating procedure, this updating may be selective with respect to subscribers whose information are stored in the user's private database. For example, the User Program may generate a query message to the central database asking whether any changes have been made to data records belonging to one or more selective subscribers.

Figure 8:
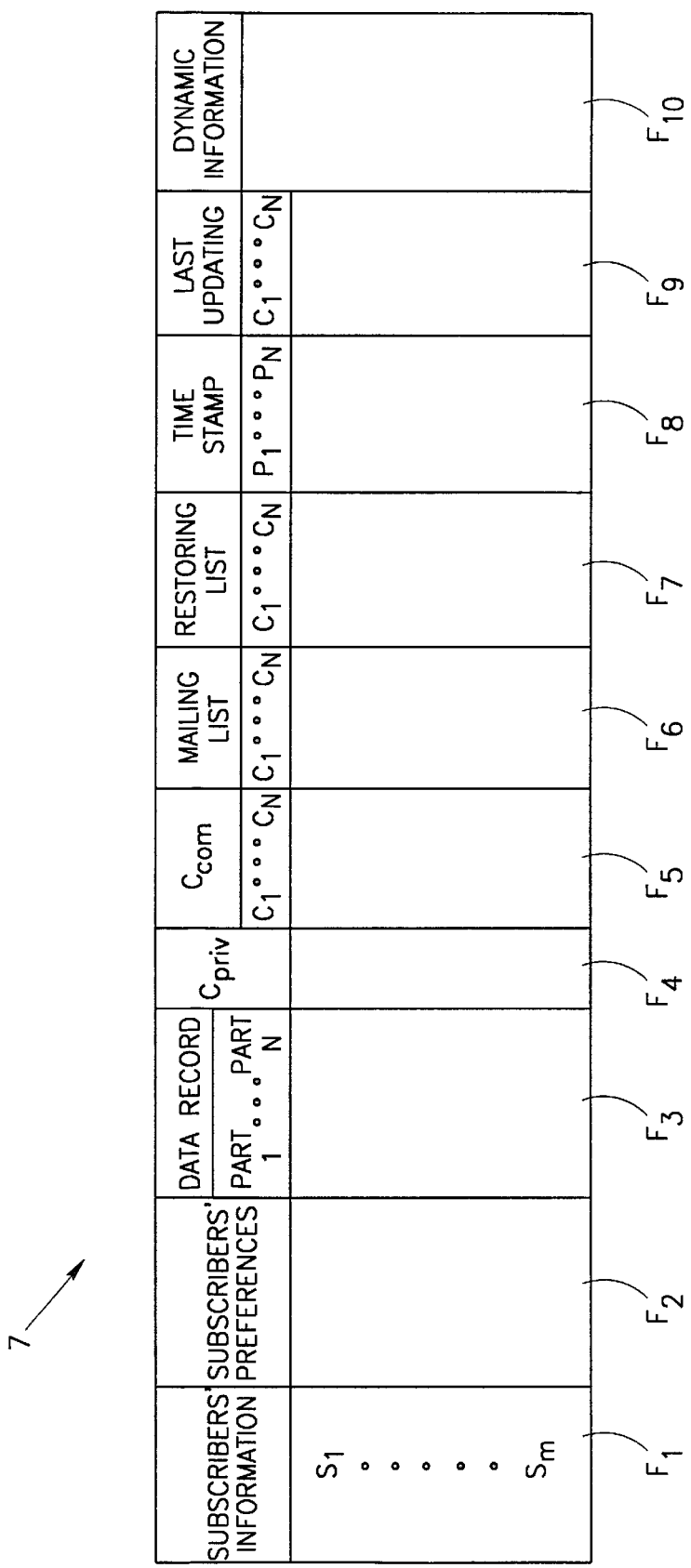
FIG. 8 is a schematic illustration of an example suitable for the design of a central database in the system of either of FIGS. 2a and 2b.

FIG. 8 illustrates one possible example of the design of the central database 7. According to this specific example, the central database 7 is composed of a plurality of fields (or groups of fields), e.g. ten groups $F_1$–$F_{10}$. The first group $F_1$, so-called "Subscribers' Informtion", contains data representative of the registered subscribers $S_1$–$S_m$ to the manager 6. Group $F_2$ contains data representative of the subscriber's preferences per choice of each specific subscriber, for example, the network's address of a personal communication unit to which messages should be addressed, or information allowed to be transmitted to other subscribers as an indication that this specific subscriber has requested their personal data. The third group $F_3$ contains personal data records of the registered subscribers. Each data record may comprise N different information portions. Consequently, N different communication codes may be assigned to each one of m subscribers and included in the field $F_5$. Group $F_4$ contains private codes of the registered subscribers. Group $F_6$ contains information about those subscribers who have requested and obtained the personal data (or a specific part thereof) of each specific subscriber, i.e., "Mailing List" of the specific subscriber. As for the requested personal data of various subscribers duly transmitted to a specific subscriber per his request ("Restoring List"), these data are included in the group $F_7$.

The maintenance of "Restoring Lists" in the central database is optional, and is performed in accordance with the choice of each specific subscriber. However, it is important to note that, if a specific subscriber selects this function, he will be able to restore his private database when something happens to the original one maintained in the memory of his personal communication unit (i.e., his private database).

Groups $F_8$ and $F_9$ contain data representative of, respectively, the time of the changes made to the personal data records ("Time Stamp") and the time of the last updating procedure executed with respect to each subscriber. Group $F_{10}$, a so-called "Dynamic Information", presents data indicative of a "new" address for communication (e.g. phone number, Email, etc.) of a specific subscriber introduced by him (or by authorized person) to be currently relevant.

The entrance of the new address in the dynamic field may be caused by the fact that this specific subscriber is going to be available at this address within a certain period of time, and intends to return to the "main" address indicated in his data record (Groups $F_2$ and/or $F_3$) when this period of time expires. Additionally, the subscriber may specify only some of his associated code receivers appearing in his "Mailing List" to be updated with these temporary changes. This may be implemented in the following manner.

When a specific subscriber enters any temporary address for communication into his associated dynamic field, the central database manager (i.e. CPU 22) generates a query like this: "To Update Everybody from Mailing List?". If the subscriber's answer is "NO", he receives his Mailing List displayed and selects (e.g. marks) those code receivers whom he wishes to be updated. If the subscriber answers "YES", the central database manager operates to update all of those subscribers that appear in the Mailing List of this specific subscriber.

Consequently, when a registered subscriber $S_1$ wishes to communicate with another subscriber $S_2$ from his "Restoring List", the manager operates to check whether there exists any temporary address in the dynamic field of subscriber $S_2$. If so, the manager determines whether the area code tariffs of the "new" address, recorded in the dynamic field, and the "main" address, recorded in the "Restoring List" of subscriber $S_1$, are equal or different. If the area code tariffs are different, the manager generates a corresponding notification massage to subscriber $S_1$, and asks him whether to perform the connection (e.g. dialing) or not.

As indicated above, more than one communication code may be assigned to the same subscriber. These codes may be associated with different parts of the same data record with or with different data records belonging to the same subscriber. In other words, the receivers of different communication codes of the codes' owner will have access to different parts of the information associated with this code owner. For example, one such communication code may be assigned to relevant data associated with the position of an individual in a company, so-called "business code" $C^{(bus)}_{com}$. The other communication code, so-called "personal code" $C^{(per)}_{com}$, is representative of the individual's personal information irrespective of his job position.

Figure 9A:
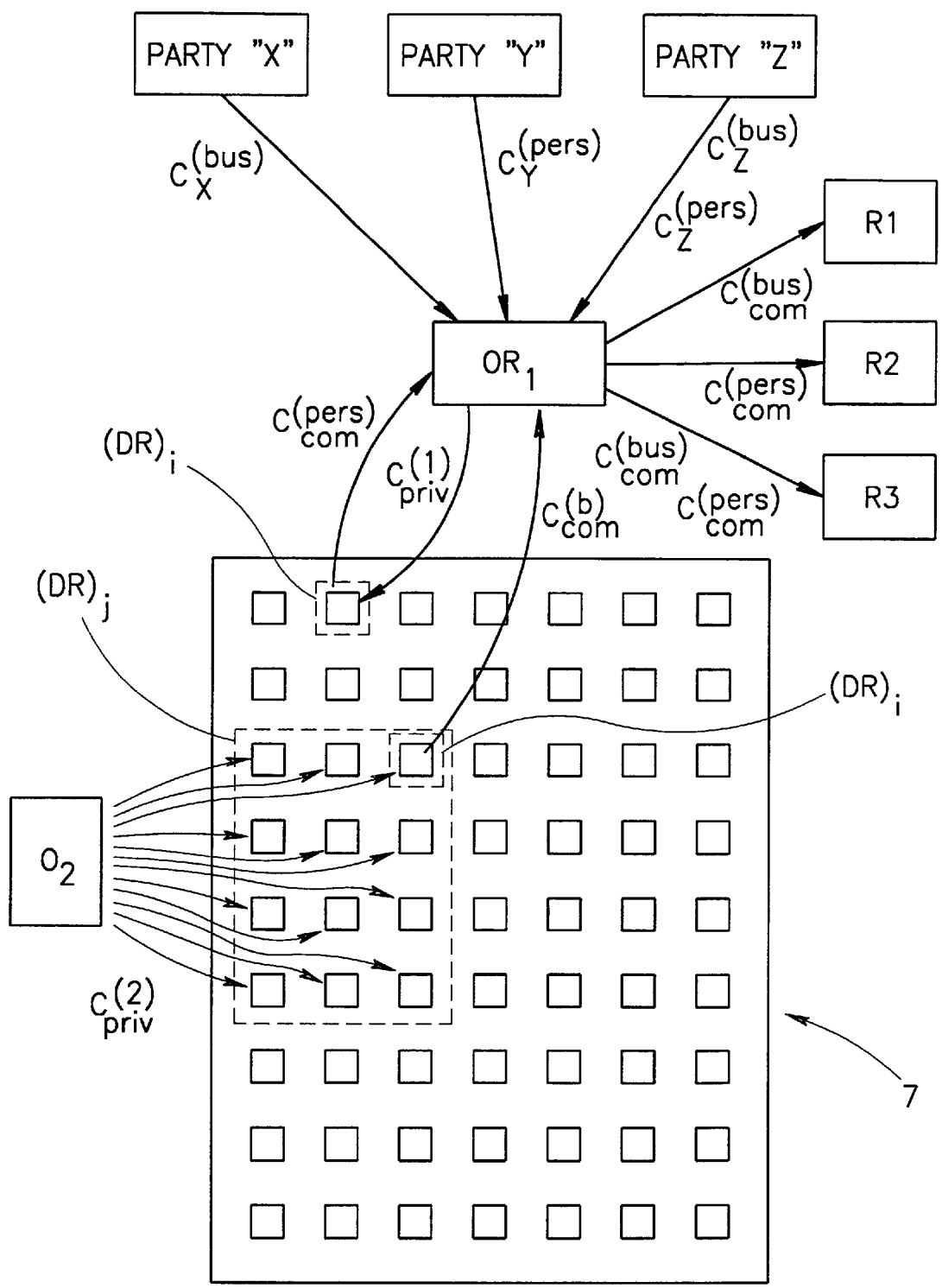
FIGS. 9a to 9c schematically illustrate the main principles of managing central and private databases in the system of either of FIGS. 2a and 2b.
Figure 9B:
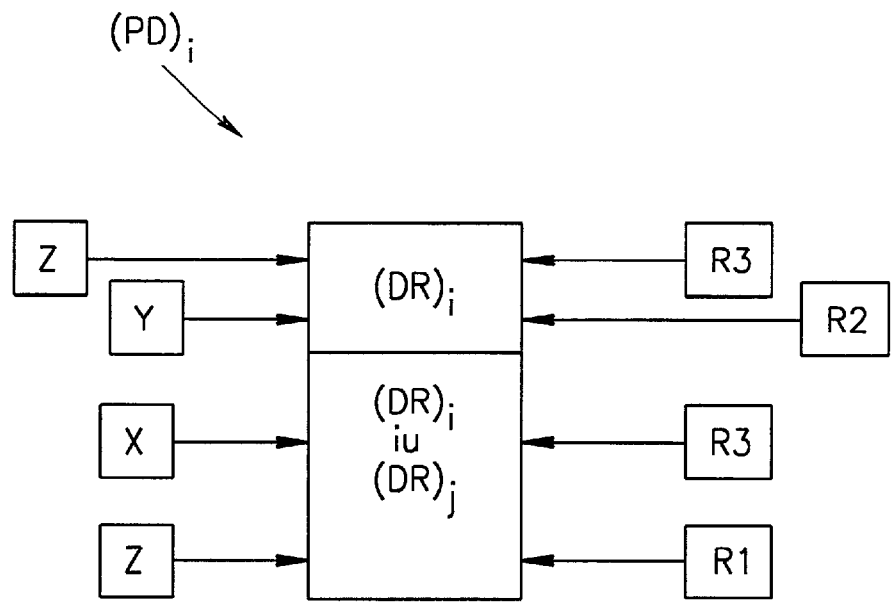
Figure 9C:
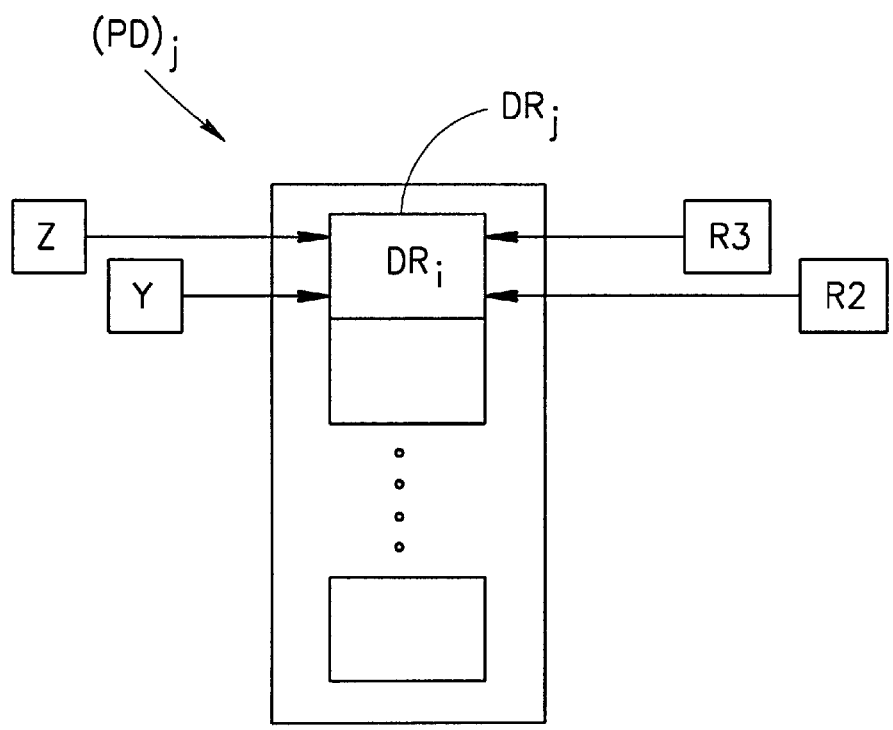

Reference is now made to FIGS. 9a–9c illustrating the main principles of the above-mentioned concept. As shown in FIG. 9a, the central database 7 contains a plurality of different data records, generally at $(DR)_i$, each corresponding to a different communication code. A user $OR_1$ is the owner of a personal communication code $C^{(per)}_{com}$ and a private code $C^{(1)}_{priv}$, both associated with his data record $(DR)_i$.

The code owner $OR_1$ is also an employee of a company and represents a specific position there. The company owns a group $(DR)_j$ of data records $(DR)_j$, each data record $(DR)_j$ being associated with one of the company's employees (i.e. a specific position). Consequently, a business communication code $C^{(bus)}_{com}$ is assigned to each data record within the group $(DR)_j$, and the company is the owner $O_2$ of these business communication codes. The company (i.e. the owner $O_2$) also owns a corresponding number of private codes $C^{(2)}_{priv}$ (or the single private code) for editing data contained in the data record group $(DR)_j$.

As further shown in FIG. 9a, the code owner $OR_1$ may also be a receiver of several communication codes given to him by other parts either through personal or business contacts. According to the present example, such an owner/receiver $OR_1$ may has received a business code $C_X^{(bus)}$ from party X, a personal Code $C_Y^{(pers)}$ from party Y and both such codes $C_Z^{(bus)}$ and $C_Z^{(pers)}$ from party Z. In a similar manner, the owner/receiver $OR_1$ delivers his business code $C^{(bus)}_{com}$, personal code $C^{(per)}_{com}$, and both business and personal codes to code receivers $R_1$, $R_2$ and $R_3$, respectively.

FIGS. 9b and 9c illustrate in a self-explanatory manner a private database (PD)$_i$ of the owner/receiver O/R$_1$ and a private database (PD)$_j$ of the owner $O_2$ (i.e. company), respectively. When the individual, constituting the owner/receiver O/R$_1$, leaves his position with the company (owner $O_2$), the communication code $C^{(bus)}_{com}$ representative of this specific position in the company remains with the company, and will be assigned to another employee filling this specific position. Additionally, all registered business connections created during the activity of the specific employee O/R$_1$ with the company (particulars received or transmitted to and from the data record associated with the business code $C^{(bus)}_{com}$) remain in the ownership of the company. On the other hand, all the contacts of the individual O/R$_1$ may remain in his possession. In other words, each code owner (individual or company) will have the option to keep track of those parties (code receivers) who requested his/its data record or provided him/it with their data records. The owner O/R$_1$ (i.e. individual) and the owner $O_2$ (i.e. company) use their different private codes to keep the corresponding data records (DR)$_i$ and (DR)$_1$, respectively, up to date.

As the parties $R_1$, $R_2$ and $R_3$, who received the business code belonging to a specific position in the company, they will always be able to get in contact with the person currently manning this position in the company, whenever the receiver desired, even if personnel relocations have occurred in between. In parallel, it will always be possible for those parties who received the personal code of a specific individual to reach him. It is a typical case that the private database of the employee is maintained in his personal communication device, while the private database of the employer (company) is maintained in the company's respective utility.

The advantages of the present invention are thus self-evident. The network's subscriber obtains the software package ("User program") installed in his communication unit (PC or phone device), thereby becoming a registered subscriber to the central database manager 6. If a telephone network is considered, the user's phone device has be to equipped with an appropriate programming/interface utility, the provision of which enables the phone device to be used as both the phone and portable computer. The user having such a communication device at his disposal may connect to the manager side 6 to subscribe to the central database 7 and to enjoy appropriate services, as described above.

The codes' owner may apply his communication code(s) to his business card or deliver the code(s) in any other suitable way. The code(s) receiver, in turn, is provided with a very simple and expedient way of recalling and contacting those who provide him with their business cards.

It should also be noted that the users' interface presented at the personal communication device may typically include a connection key, which, whilst being actuated, initiates the on-line connection between the code receiver and code owner. The program may be such that, if the code receiver actuates the connection key, the on-line connection between the code receiver and the code owner is established upon receiving the owner's permission. The provision of the dynamic field ($F_{10}$ in FIG. 8) facilitates communication between the subscribers and prevents them from unforeseen expenses.

As indicated above, either one of the user's Mailing and Restoring Lists or both of them may be maintained in the private database in the user's personal communication device, rather than in the central database, per the user's choice. In this case, User Program installed in the personal communication device is responsible for creating and maintaining the user's personal data record, assigning a communication code to him and managing the transmission of relevant information.

Figure 10:
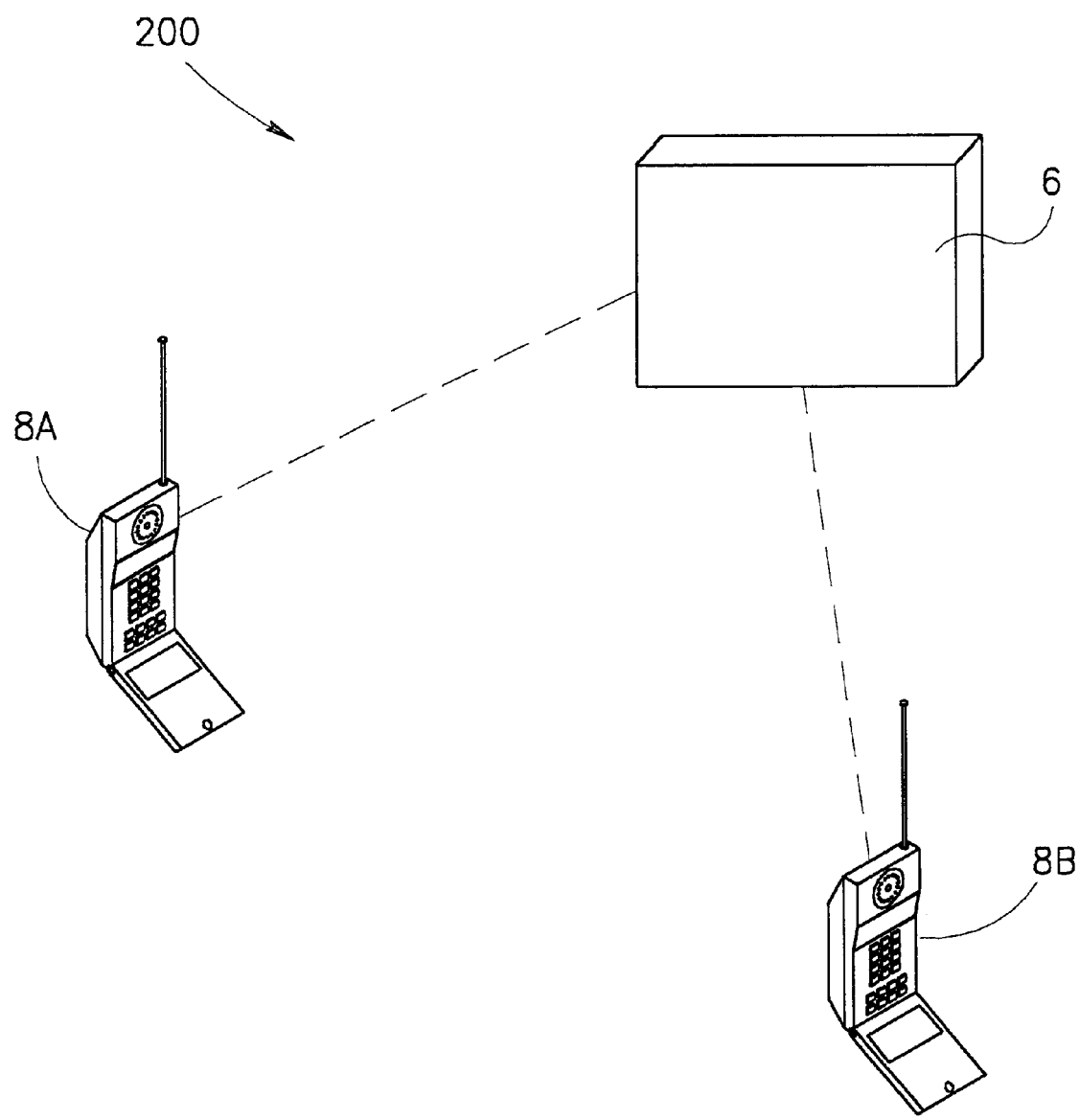
FIG. 10 is a schematic illustration of a communication system, constructed according to yet another embodiment of the invention.

FIG. 10 illustrates a communication system 200, utilizing the above idea. The system 200 serves for communication between users A and B utilizing their mobile "smart-type" phone devices 8a and 8b, respectively, through the telephone network. Each of the devices 8a and 8b is preprogrammed with User Program, and is connectable to the central database manager 6, per the user's choice, as will be described more specifically further below. Thus, in this specific example, the manager utility is constituted by the User Programs installed at the subscribers' sides and connectable to each other through the network.

Figure 11:
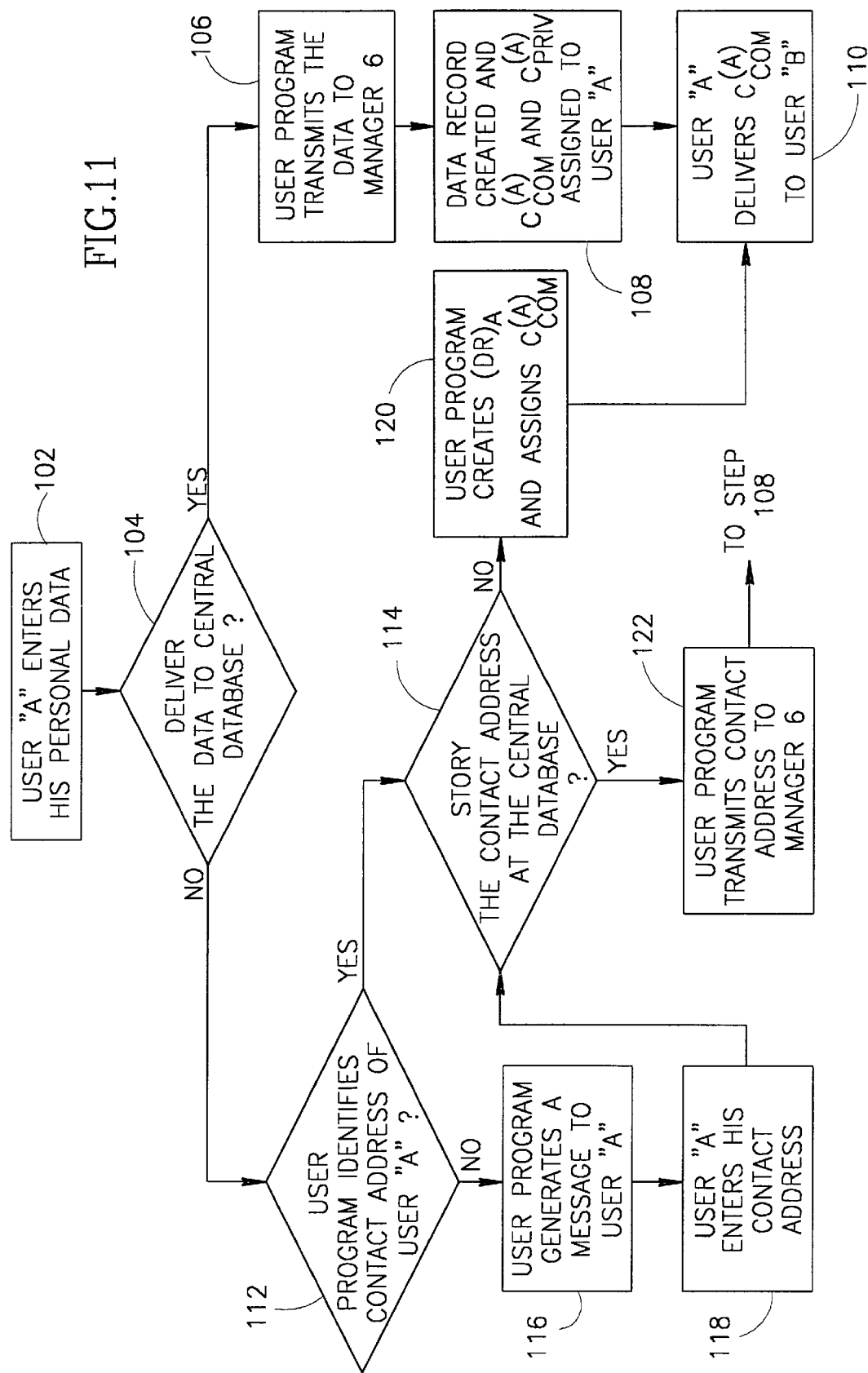
FIG. 11 is a flow diagram of the operation of the system of FIG. 10, initiated by a code owner.

The operation of the system 200 will now be described with reference to FIG. 11, showing the main operational steps initiated by user A, and FIGS. 12a–12b, showing the main operational steps initiated by user B. Initially, user A enters his personal data into his phone device through the interface of the User Program (step 102). In this specific example, the User Program, in response to the entrance of such data, generates a query asking user A whether he wishes his personal data record to be stored in the central database 7 (step 104).

If user A selects this option, the User Program operates to transmit his personal data to the central database manager 6 through the communication link (step 106). The manager creates the user's personal data record to be stored in the central database 7, and assigns private and communication codes $C^{(A)}_{priv}$ and $C^{(A)}_{com}$ to user A (step 108). Thus, user A becomes the owner of these two codes, and may deliver the communication code $C^{(A)}_{com}$ to people with whom he wishes to keep in touch, e.g., user B, (step 110), and may use the private code $C^{(A)}_{priv}$ for introducing changes in his personal data record, when necessary.

If user A declines this offer, the User Program tries to identify the user's contact address (step 112), namely the network's address of this specific communication device (phone number in this specific example). It should be noted that user A may use his personal computer as the communication device, in which case the user's contact address may be his E-mail address. Upon identifying the user's contact address, the User Program generates a query asking user A whether he agrees to have his contact address maintained at the central database (114).

The case may be such that User Program fails to identify the user's contact address. In this case, the program generates a message to user A inviting him to supply his contact address (step 116). When user A enters his contact address (step 118), he receives the query as to whether to store the contact address in the central database.

If user A disagrees to have his contact address maintained at the central database, User Program creates the personal data record (DR)$_A$, stores it in the memory of the phone device and assigns a communication code $C^{(A)}_{com}$ to user A (step 120), thereby allowing him to deliver the communication code $C^{(A)}_{com}$ to other parties (step 110). If user A selects the central database, User Program transmits the contact address to the central database manager (step 122). Consequently, the manager assigns private and communication codes $C^{(A)}_{priv}$ and $C^{(A)}_{com}$ to user A (step 108). It should be noted that the entered communication code contains data indicative of a specific communication device, e.g., a preferred communication device of user A in which his personal data record is maintained, of his associated Service Provider, or of the central database manager.

Figure 12:
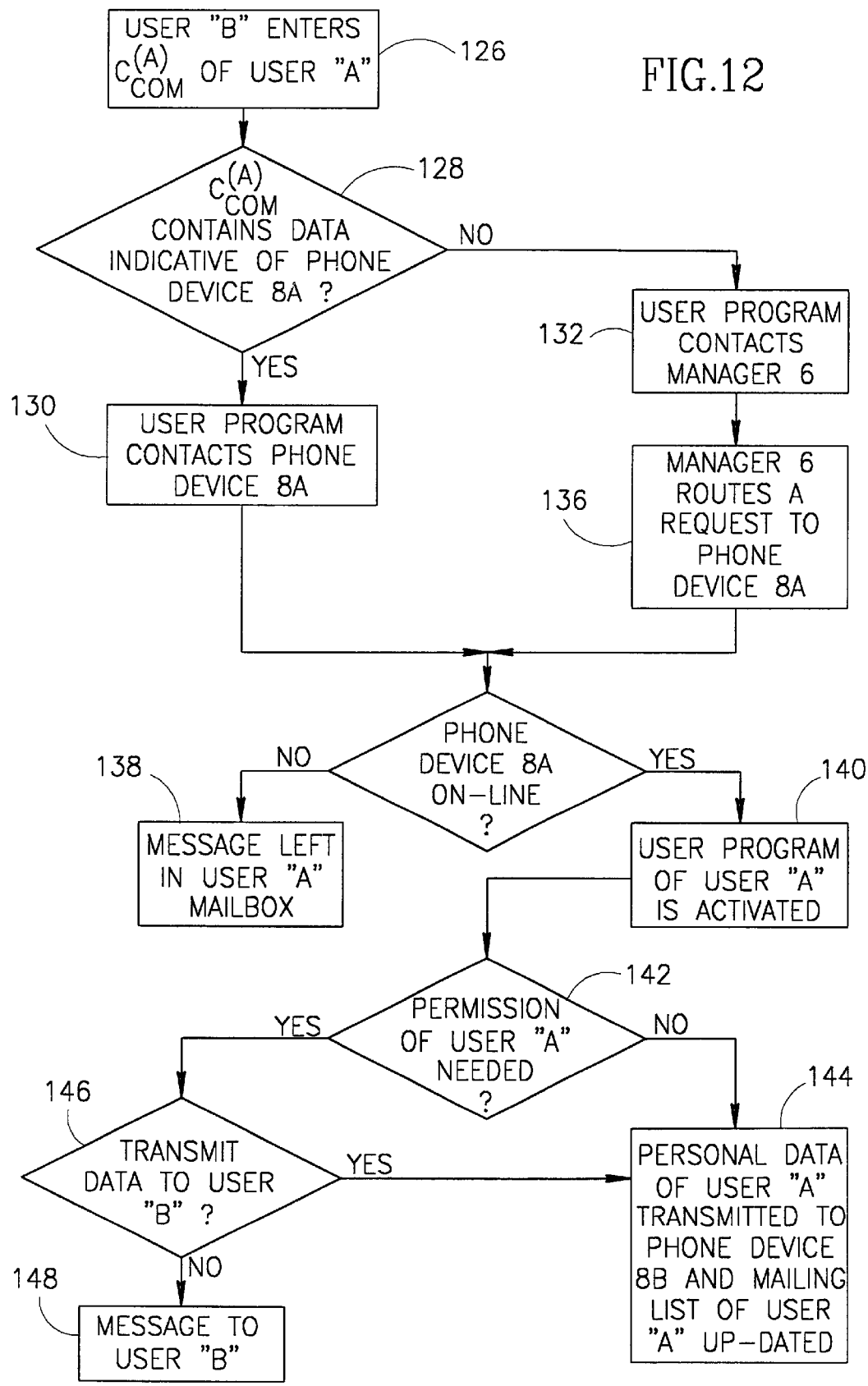
FIG. 12 shows a flow diagram of the operation of the system of FIG. 10, initiated by a code receiver

Turning now to FIG. 12, user B to whom the communication code $C^{(A)}_{com}$ has been delivered, and who thereby is considered as the code receiver, wishes to obtain personal data of user A associated with this communication code $C^{(A)}_{com}$, and to have this data stored in his personal communication device (e.g., phone device). To this end, user B enters this communication code through the interface of his User Program (step 126).

User Program identifies whether the entered communication code contains data indicative of a specific communication device (i.e., a preferred communication device of user A in which his personal data record is maintained) or of the central database manager 6 (step 128). Accordingly, User Program initiates contact with either the communication device of user A (step 130) or the manager 6 (step 132).

In the case that User Program has contacted the central database manager 6, the manager routes the request to the communication device of user A (step 136). To this end, the manager generates a corresponding message to User Program of user A indicative of the relevant data of user B (per his preferences, as described above, e.g., his network's address), who is asking for the personal data of user A.

Thus, the communication device of user A is contacted either by User Program of user B or by the central database manager. If the communication device of user A is in the off-line mode, i.e., is not continuously connected to the telephone (or computer) network, the User Program of user B generates a corresponding message and transmits it to the user's A mailbox (step 138). If the user's A device is in the on-line mode, his User Program becomes actuated (step 140), and operates to identify whether any data from the user's A personal data record can be transmitted in response to any request or upon the permission of user A (step 142).

If no permission is required, User Program of user A transmits the requested personal data, i.e., associated with the communication code $C^{(A)}_{com}$, to the communication device of user B and keeps the user's B personal data (e.g., his network address) in the Mailing List of user A (step 144). If the user's A permission is required, his User Program presents a corresponding message to him (step 146). Then depending on the user's A selection, User Program either transmits his personal data to user B (step 144), or generates and transmits a corresponding message to user B indicative of that the transmission of this personal data is not allowable (step 148).

Figure 13:
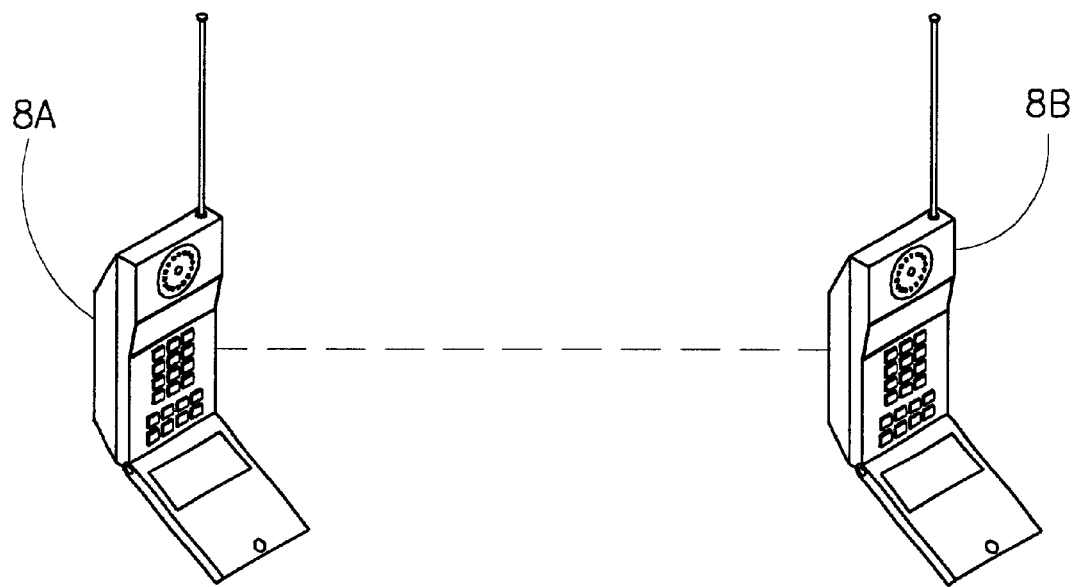
FIG. 13 is a schematic illustration of yet another embodiment of the invention.

As indicated above, the manager utility may be constituted by User Programs installed in the personal communication devices of the code owner and the code receiver, without utilizing any central database manager. In this case, as illustrated in FIG. 13, a communication system 300 is actually composed of a plurality of users communication devices—two devices 8A and 8B being shown in the present example to facilitate understanding, and a communication link through which they are connectable to each other. The term "communication link" in this specific example signifies also a plurality of server utilities (server providers) enabling the connection between these devices. In the present example, the personal communication devices are users' mobile phones, but it should be understood that such devices may also be computers. The User Program is installed in each such communication device.

The system 300 operates in the following manner. User A, to become the owner of a communication code $C^{(A)}_{com}$, through his User Program, enters all desired information and creates his personal data record, which is stored in the memory of his communication device. The User Program either creates user A private database or utilizes the existing one, if any (per his choice). Upon creating the personal data record, the User Program generates the communication code $C^{(A)}_{com}$, the network address of user A communication device being a part of this communication code. User A could select specific fields in the data record that contain information to be transmitted with or without his specific permission.

User B, who has received this communication code and who wishes to obtain corresponding personal information of user A stored in his personal communication device in a manner to be kept up to date, uses the interface of his User Program for entering this code $C^{(A)}_{com}$. The User Program of user B request him to supply information to be transmitted to user A for identifying user B who requests the personal information of user A. Then, the Program generates a request message indicative of that user B requests personal information from the data record of user A corresponding to this communication code, and operates to connect the communication devices of users B and A through the communication link and to transmit this message, provided the network address of user A is identified. Obviously, the User Program of user B, similarly to that of user A, manages the private database of user B (i.e., either an existing one or a new one created by the User Program for the purposes of the present invention).

The User Program of user A identifies this request message and personal information of user B (if any) to be recorded in the "Mailing List" of user A, and operates in accordance with the selection of user A to transmit the requested information. If no personal information of user B is supplied, the User program of user A records the identified network's address of user B, i.e., the address from which the request message has arrived. The User Program of user A will use this address or that indicated by user B, if any, for updating purposes. To this end, the User Program of user A, in response to changes entered in the personal data record of user A, will generate (either automatically or periodically, per choice of user A choice, as described above) a corresponding message and transmit it to the network's address of user B. Obviously, user A has an option to select those to whom he wishes to transmit such a notification (updating) message without his specific permission.

It should be noted that the communication code of user A generated by his User Program includes data indicative of this software package. Consequently, when using phone devices for communication, this data can be identified to realize that the call comes from User Program, and therefore to actuate User Program of user B, without generating an incoming call at user B's side.

The User Program of User B, upon receiving the requested information, creates a specific record in the "Restoring List" of user B maintained in his private database. Upon receiving a message indicative of changes in the information contained in this record (coming from the User program of user A), the User Program of user B operates to update the corresponding record.

It should be noted that such a private database may be composed of a database maintained in a memory of the server utility of a specific LAN, for example the server of the company's computer network, and a database maintained in the memory of a personal computer of a particular company's employee. For example, the employee's "Mailing" and/or "Restoring" lists are maintained in the company's server, and his personal information (his personal data record) and, possibly, one of the above lists, is stored in his personal computer. As indicated above, each data record is associated with its owner, its corresponding "Mailing List" and corresponding communication code of the code owner. All these information may be maintained at the code owner's side and/or at the central database. As for the case of distributed database, for example, the data record itself is maintained at the code owner's side (his private database), the owner's particulars (e.g., his name) is maintained at the Service Provider's side, and the "mailing List" is maintained in the central database.

It is important to note that the case may be such that information contained in the "personal" data record does not necessarily relate to the particulars of the code owner (name, address, etc.), but rather to a specific entry. For example, a card containing such information relates to a product commercially available from a specific company. Thus, with the present invention, this company may record a list of customers who have purchased this product to inform them about new, improved models of the product or other products of the company.

Another example of such an entity-like "subscriber" to which the data contained in the data record actually relates, is a class picture. Thus, young people whilst graduating from high school, may create such a data record to have the opportunity to keep in touch over time.

Thus, the communication code enabling the "keep in touch" technique according to the invention contains data providing access to a corresponding part of the information included in the data record of the code owner. These data depends on the kind of the manager utility.

If the central database manager serves as the manager utility, such a communication code is indicative of the network's address of the manager and of an identification code of a corresponding data record stored in the central database. If the manager utility managers a distributed database, the communication code includes the network address of a corresponding Service Provider, the identification code of a corresponding database where the data record is maintained and the identification code of this data record. If User Programs serve as the manager utility, the communication code is indicative of the network address of a corresponding Service Provider, the network address of the code owner (e.g., his phone number or Email) and identification code of a corresponding data record at user's private database.

Thus, the present invention utilizes users' personal communication devices (phone device, computer) connectable to each other through the network, and utilizes the manager utility (central database manager associated with the network's server or User Programs installed in the personal communication devices) to facilitate the keeping in touch" between the users.

Those skilled in the art will readily appreciate that various modifications and changes can be applied to the preferred embodiments of the invention as hereinbefore exemplified without departing from its scope defined in and by the appended claims. For example, the network may be a computer or telephone network or a combination of both. Consequently, the communication device from which the address code (i.e. requested data) is input and to which the relevant information is transmitted, may be a computer or a phone device equipped with all necessarily utilities. The programming means managing the central database (API), and that managing the private database ("User Program"), may be of any known suitable kind. In the method claims, which follows, characters that are used to designate claim steps are provided for convenience only, and do not apply to any particular order of performing the steps.

What is claimed is:

1. A method for managing databases of first and second users by transferring data through a network between a first communication device responsive to inputs by the first user and a second communication device responsive to inputs by the second user, utilizing a manager utility, said method comprising:

providing the first user database and storing in the first user database a data record associated with selected information of the first user, and updating the selected information in the data record from the first communication device in response to inputs by the first user; generating, by the manager utility, a specific communication code uniquely assigned to the data record, the specific communication code containing an identification of a network address of a first software package of the manager utility related to the first user, and an identification of the data record to which the specific communication code is assigned, the first user thus representing a first code owner;

providing the specific communication code to the second communication device, the specific communication code, when being input to the second communication device, under control of the second user, initiating a request for the selected information of the first user through the network;

sending the selected information from the first user database, through the network, to the second communication device, in response to said request;

updating the first user database with data indicative of the second user request, thereby enabling updating of the second user database with the updated selected information of the first user.

2. The method according to claim 1, further comprising the step of allowing the first user to define his preferences with regard to at least one of the following: manner of sending the selected information of the first user to the second user, and updating the second user database; and registering the first user preferences in the first user database.

3. The method according to claim 2, wherein said manner of sending the selected information to the second user comprises the step of, in response to said request, notifying the first user about a request from the second communication device, and allowing said sending of the selected information to the second communication device upon receiving permission of the first user.

4. The method according to claim 1, further comprising identifying data relating to the second user as supplied by the second user and registering the second user in the first user database.

5. The method according to claim 2, wherein said step of updating of the second user database comprising identifying, by the manager utility, changes in the selected information resulting from the updating of said information from the first communication device in response to inputs by the first user immediately after the changes have been introduced, and generating an updating message to the second user.

6. The method according to claim 2, wherein said step of updating of the second user database comprises periodically initiating, by the manager utility, an automatic updating procedure in order to identify changes in the selected information of the first user resulting from the updating of said information from the first communication device in response to inputs by the first user, and generating an updating message to the second user.

7. The method according to claim 1, wherein the manager utility comprises said first software package accessible by the first user through a first communication system connectable to the network, and a second software package similar to the first software package and accessible by the second user through a second communication system connectable to the network, the first and second software packages operating for managing the first and second users databases in accordance with a predetermined communication protocol based on exchange of messages generated by one of the software packages and identifiable by the other software package.

8. The method according to claim 7, wherein said predetermined protocol enables off-line communication between the first and second communication systems.

9. The method according to claim 8, wherein the off-line communication protocol is e-mail messages protocol.

10. The method according to claim 7, wherein the first user database is stored in the first communication system.

11. The method according to claim 7, wherein the second user database is stored in the second communication system.

12. The method according to claim 7, wherein at least a part of the first user database is stored in a central database maintained in a server connected to the network and installed with a software package of the manager utility similar to said first and second software packages.

13. The method according to claim 12, and also comprising the step of:
operating the first software package by the first user to create a private code belonging to the first user and assigned to said at least part of the first user database stored in the central database, said private code being applicable by the first user from a communication system connectable to the network to enable access to said at least part of the first user database.

14. The method according to claim 7, wherein at least a part of the second user database is stored in a central database maintained in a server connected to the network and installed with a software package of the manager utility similar to said first and second software packages.

15. The method according to claim 7, wherein the second software package operates automatically to selectively perform at least one of the following steps:
in response to input of the specific communication code, initiating the request for the selected information of the first user;
in response to a message generated by the first software package and including the selected information of the first user, storing the selected information of the first user in a data record of the second user database; and
in response to an updating message generated by the first software package and being indicative of changes in said selected information of the first user, updating the data record in the second user database.

16. The method according to claim 15, and also comprising the step of:
operating, under control by the second user, the second software package accessible by the second user to carry out at least one of the following:
define preferences of the second user with regard to manner of updating the data record in the second user database;
define data relating to the second user to be transmitted to the first user to thereby enable the first software package to register data relating to the second user; and
create a second specific communication code assigned to a data record associated with information of the second user and stored in the second user database, wherein the second specific communication code contains an identification of a network address of the second software package and an identification of the data record associated with the information of the second user to be identified by the second software package as a request for said information of the second user, the second user thereby representing a second code owner who is allowed to define his preferences with regard to at least one of the following: manner of generation of a message including the information of the second user to be transmitted to another user; manner of generation of an updating message to be transmitted to the other user to enable updating of a database of the other user, who has received said information of the second user, with changes in said information; and manner of updating the second user database on receivers of said information of the second user.

17. The method according to claim 1, wherein the manager utility comprises a first software package installed in a first communication system accessible to the first user and connectable to the network, and a second software package similar to the first software package and installed in a second communication system accessible to the second user and connectable to the network, the first and second software packages operating for managing the first user database and the second user database in accordance with a predetermined communication protocol based on exchange of messages generated by one of the software packages and identifiable by the other software package.

18. The method according to claim 17, wherein said predetermined protocol enables off-line communication between the first and second communication systems.

19. The method according to claim 18, wherein the off-line communication protocol is e-mail messages protocol.

20. A system for managing first and second user databases by transferring data through a network between a first communication device responsive to inputs by the first user and a second communication device responsive to inputs by the second user, said system comprising:
a manager utility operative for:
generating a specific communication code that is to be provided to the second communication device, the specific communication code being uniquely assigned to a data record in the first user database associated with selected information of the first user, and containing an identification of a network address of the manager utility and an identification of the data record to which the specific communication code is assigned, the specific communication code, when being input to the second communication device, under control of the second user, initiating a request for the selected information of the first user through the network;
updating the selected information in the data record from the first communication device in response to inputs by the first user;
sending the selected information from the first user database, through the network, to the second communication device in response to said request; and
updating the first user database with data indicative of said request of the second user, thereby enabling updating of the second user database with the updated selected information of the first user
means in said second communication device for sending the specific communication code through the network, under control of the second user, to initiate the request for the selected information of the first user.

21. The system according to claim 20, wherein the first user database is stored in the first communication device.

22. The system according to claim 20, wherein a second user database is stored in the second communication device.

23. The system according to claim 20, wherein the manager utility comprises a first software package installed in the first communication device and a second software package similar to the first software package and installed in the second communication device, the first and second software packages operating for managing the first and second users databases in accordance with a predetermined communication protocol based on exchange of messages generated by one of the software packages and identifiable by the other software package.

24. The system according to claim 23, wherein said manager utility further comprises an additional similar software package installed in a server connected to the network for managing a central database in response to messages generated by at least one of the software packages of the first and second communication devices.

25. The system according to claim 24, wherein at least a part of the first user database is stored in said central database, the additional software package of the manager utility being operable by the first user to create a private code belonging to the first user and assigned to at least part of the first user database to enable access to the at least part of the first user database.

26. The system according to claim 24, wherein at least a part of the second user database is stored in said central database, the additional software package of the manager utility being operable by the second user to create a private code belonging to the second user and assigned to at least part of the second user database to enable access to said at least part of the second user database.

27. The system according to claim 20, wherein the data record to which the specific communication code is assigned contains at least one of:

personal information of the first user;

data informative of a product commercially available from a specific company, the first user thereby representing the company to which said information belongs; and data informative of a specific position of an employee in a company, the first user thereby representing the company to which said information belongs.

28. The system according to claim 20, wherein said network is one of a computer network and a telephone network.

29. A manager utility for managing users databases, the manager utility comprising a software package installed in a communication system connectable to a network, said software package comprising: an interface utility; an identification utility, and a processor utility, and operating for managing the databases by selectively carrying out one of the following steps:

in response to a first user's input, creating a specific communication code assigned to a data record associated with selected information of the first user and stored in the database of said first user, wherein said specific communication code of said first user contains data indicative of a network address of said software package and data indicative of said data record to be identified by said software package as a request for said selected information, said specific communication code being thereby capable of being input by a second user through an interface utility of a software package similar to the software package of the manager utility installed in a communication system accessible by the second user and connectable to the network to initiate the request for said information;

in response to input of the first user, registering the first user's preferences with regard to at least one of the following: manner of generation of a message including said information to be transmitted to the second user; manner of generation of an updating message to be transmitted to the second user to enable updating of the database of the second user, who has received said information, with changes in said information; and manner of updating the database of the first user on receivers of said information;

in response to input of the first user, identifying changes introduced to said information, to enable generation of an updating message to be transmitted to the second user;

in response to the first user's input of a communication code, initiating a request for corresponding information to which the input communication code has been assigned;

in response to incoming messages, operating to selectively carry out at least one of the following: identify said specific communication code and data relating to the second user to generate a message including said information and allow transmission of said message to the second user; register data relating to the second user, to thereby enable generation of the updating message to update the database of the second user with changes in said information, whenever said changes occur; identify received information to store the received information in a data record of the first user's database; and identify updated information to update the database of the first user.

30. A software package directly loadable on a communication system connectable to a network, wherein said software package, when loaded onto the communication system, is capable of operating as the manager utility according to claim 29.

31. A communication system installed with the software package according to claim 30, wherein said communication system is connected to the network and is operable for transmitting said software package through the network.

* * * * *